United States Patent
Venkataraman et al.

(10) Patent No.: US 10,009,538 B2
(45) Date of Patent: Jun. 26, 2018

(54) SYSTEMS AND METHODS FOR GENERATING COMPRESSED LIGHT FIELD REPRESENTATION DATA USING CAPTURED LIGHT FIELDS, ARRAY GEOMETRY, AND PARALLAX INFORMATION

(71) Applicant: FotoNation Cayman Limited, San Jose, CA (US)

(72) Inventors: Kartik Venkataraman, San Jose, CA (US); Dan Lelescu, Morgan Hill, CA (US); Gabriel Molina, Sunnyvale, CA (US)

(73) Assignee: FotoNation Cayman Limited, San Jose, CA (US)

( * ) Notice: Subject to any disclaimer, the term of this patent is extended or adjusted under 35 U.S.C. 154(b) by 0 days. days.

(21) Appl. No.: 15/599,900

(22) Filed: May 19, 2017

(65) Prior Publication Data

US 2017/0257562 A1    Sep. 7, 2017

Related U.S. Application Data

(63) Continuation of application No. 15/253,605, filed on Aug. 31, 2016, now abandoned, which is a
(Continued)

(51) Int. Cl.
*H04N 5/232* (2006.01)
*H04N 5/225* (2006.01)
(Continued)

(52) U.S. Cl.
CPC ........... *H04N 5/23222* (2013.01); *G06K 9/66* (2013.01); *G06T 7/50* (2017.01); *G06T 7/60* (2013.01);
(Continued)

(58) Field of Classification Search
None
See application file for complete search history.

(56) References Cited

U.S. PATENT DOCUMENTS

| 4,124,798 A | 11/1978 | Thompson |
| 4,198,646 A | 4/1980 | Alexander et al. |

(Continued)

FOREIGN PATENT DOCUMENTS

| CN | 1669332 A | 9/2005 |
| CN | 1839394 A | 9/2006 |

(Continued)

OTHER PUBLICATIONS

Extended European Search Report for EP Application No. 13810429.4, Completed Jan. 7, 2016, dated Jan. 15, 2016, 6 Pgs.
(Continued)

*Primary Examiner* — Eileen M Adams
(74) *Attorney, Agent, or Firm* — KPPB LLP

(57) ABSTRACT

Systems and methods for the generating compressed light field representation data using captured light fields in accordance embodiments of the invention are disclosed. In one embodiment, an array camera includes a processor and a memory connected configured to store an image processing application, wherein the image processing application configures the processor to obtain image data, wherein the image data includes a set of images including a reference image and at least one alternate view image, generate a depth map based on the image data, determine at least one prediction image based on the reference image and the depth map, compute prediction error data based on the at least one prediction image and the at least one alternate view image, and generate compressed light field representation data based on the reference image, the prediction error data, and the depth map.

14 Claims, 7 Drawing Sheets

Related U.S. Application Data continuation of application No. 14/186,871, filed on Feb. 21, 2014, now Pat. No. 9,462,164.

(60) Provisional application No. 61/786,976, filed on Mar. 15, 2013, provisional application No. 61/767,520, filed on Feb. 21, 2013.

(51) Int. Cl.
  *G06T 7/50* (2017.01)
  *G06T 7/60* (2017.01)
  *G06K 9/66* (2006.01)
  *H04N 13/02* (2006.01)

(52) U.S. Cl.
  CPC ......... *H04N 5/225* (2013.01); *H04N 13/0271* (2013.01)

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,899,060 A | 2/1990 | Lischke |
| 5,005,083 A | 4/1991 | Grage |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt |
| 5,327,125 A | 7/1994 | Iwase et al. |
| 5,488,674 A | 1/1996 | Burt |
| 5,629,524 A | 5/1997 | Stettner et al. |
| 5,793,900 A | 8/1998 | Nourbakhsh et al. |
| 5,801,919 A | 9/1998 | Griencewic et al. |
| 5,808,350 A | 9/1998 | Jack et al. |
| 5,832,312 A | 11/1998 | Rieger et al. |
| 5,880,691 A | 3/1999 | Fossum et al. |
| 5,911,008 A | 6/1999 | Niikura et al. |
| 5,933,190 A | 8/1999 | Dierickx et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu et al. |
| 6,175,379 B1 | 1/2001 | Uomori et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,443,579 B1 | 9/2002 | Myers |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen et al. |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,927,922 B2 | 8/2005 | George et al. |
| 6,958,862 B1 | 10/2005 | Joseph |
| 7,015,954 B1 | 3/2006 | Foote et al. |
| 7,085,409 B2 | 8/2006 | Sawhney |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,235,785 B2 | 6/2007 | Hornback et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen |
| 7,496,293 B2 | 2/2009 | Shamir et al. |
| 7,564,019 B2 | 7/2009 | Olsen |
| 7,599,547 B2 | 10/2009 | Sun et al. |
| 7,606,484 B1 | 10/2009 | Richards et al. |
| 7,620,265 B1 | 11/2009 | Wolff |
| 7,633,511 B2 | 12/2009 | Shum et al. |
| 7,639,435 B2 | 12/2009 | Chiang et al. |
| 7,646,549 B2 | 1/2010 | Zalevsky et al. |
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev |
| 8,194,296 B2 | 6/2012 | Compton |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |

(56) References Cited

U.S. PATENT DOCUMENTS

| | | |
|---|---|---|
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Tubic et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Yang et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev |
| 8,406,562 B2 | 3/2013 | Bassi et al. |
| 8,411,146 B2 | 4/2013 | Twede |
| 8,446,492 B2 | 5/2013 | Nakano et al. |
| 8,456,517 B2 | 6/2013 | Mor et al. |
| 8,493,496 B2 | 7/2013 | Freedman et al. |
| 8,514,291 B2 | 8/2013 | Chang et al. |
| 8,514,491 B2 | 8/2013 | Duparre |
| 8,541,730 B2 | 9/2013 | Inuiya |
| 8,542,933 B2 | 9/2013 | Venkataraman |
| 8,553,093 B2 | 10/2013 | Wong et al. |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman |
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Ito et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman |
| 9,025,895 B2 | 5/2015 | Venkataraman |
| 9,030,528 B2 | 5/2015 | Pesach et al. |
| 9,031,335 B2 | 5/2015 | Venkataraman |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,049,367 B2 | 6/2015 | Venkataraman et al. |
| 9,055,233 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Florian et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,253,380 B2 | 2/2016 | Venkataraman et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,374,512 B2 | 6/2016 | Venkataraman et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,661,310 B2 | 5/2017 | Deng et al. |
| 9,811,753 B2 | 11/2017 | Venkataraman et al. |
| 9,864,921 B2 | 1/2018 | Venkataraman et al. |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0012056 A1 | 1/2002 | Trevino |
| 2002/0015536 A1 | 2/2002 | Warren |
| 2002/0027608 A1 | 3/2002 | Johnson |
| 2002/0028014 A1 | 3/2002 | Ono et al. |
| 2002/0039438 A1 | 4/2002 | Mori et al. |
| 2002/0057845 A1 | 5/2002 | Fossum |
| 2002/0063807 A1 | 5/2002 | Margulis |
| 2002/0075450 A1 | 6/2002 | Aratani |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0120634 A1 | 8/2002 | Min et al. |
| 2002/0122113 A1 | 9/2002 | Foote et al. |
| 2002/0163054 A1 | 11/2002 | Suda |
| 2002/0167537 A1 | 11/2002 | Trajkovic |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0086079 A1 | 5/2003 | Barth et al. |
| 2003/0124763 A1 | 7/2003 | Fan et al. |

(56) References Cited

U.S. PATENT DOCUMENTS

| | | |
|---|---|---|
| 2003/0140347 A1 | 7/2003 | Varsa |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng et al. |
| 2003/0211405 A1 | 11/2003 | Venkataraman |
| 2004/0003409 A1 | 1/2004 | Berstis et al. |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams |
| 2004/0100570 A1 | 5/2004 | Shizukuishi |
| 2004/0105021 A1 | 6/2004 | Hu et al. |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother |
| 2006/0046204 A1 | 3/2006 | Ono et al. |
| 2006/0049930 A1 | 3/2006 | Zruya et al. |
| 2006/0054780 A1 | 3/2006 | Garrood et al. |
| 2006/0054782 A1 | 3/2006 | Olsen |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen |
| 2007/0008575 A1 | 1/2007 | Yu et al. |
| 2007/0009150 A1 | 1/2007 | Suwa |
| 2007/0024614 A1 | 2/2007 | Tam |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0140685 A1 | 6/2007 | Wu et al. |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat et al. |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1 | 9/2007 | Weibrecht et al. |
| 2007/0228256 A1 | 10/2007 | Mentzer |
| 2007/0236595 A1 | 10/2007 | Pan et al. |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0296832 A1 | 12/2007 | Ota et al. |

(56) References Cited

U.S. PATENT DOCUMENTS

| | | |
|---|---|---|
| 2007/0296835 A1 | 12/2007 | Olsen |
| 2007/0296847 A1 | 12/2007 | Chang et al. |
| 2007/0297696 A1 | 12/2007 | Hamza |
| 2008/0006859 A1 | 1/2008 | Mionetto et al. |
| 2008/0019611 A1 | 1/2008 | Larkin |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi et al. |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger et al. |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger et al. |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan |
| 2009/0127430 A1 | 5/2009 | Hirasawa et al. |
| 2009/0128644 A1 | 5/2009 | Camp et al. |
| 2009/0128833 A1 | 5/2009 | Yahav |
| 2009/0129667 A1 | 5/2009 | Ho et al. |
| 2009/0140131 A1 | 6/2009 | Utagawa et al. |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167934 A1 | 7/2009 | Gupta |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan et al. |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |
| 2009/0274387 A1 | 11/2009 | Jin |
| 2009/0279800 A1* | 11/2009 | Uetani ............... H04N 19/176 382/238 |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang et al. |
| 2010/0053342 A1 | 3/2010 | Hwang et al. |
| 2010/0053600 A1 | 3/2010 | Tanida |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam |
| 2010/0128145 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang et al. |
| 2010/0171866 A1 | 7/2010 | Brady et al. |
| 2010/0177411 A1 | 7/2010 | Hegde et al. |
| 2010/0182406 A1 | 7/2010 | Benitez |
| 2010/0194860 A1 | 8/2010 | Mentz et al. |
| 2010/0194901 A1 | 8/2010 | van Hoorebeke et al. |
| 2010/0195716 A1 | 8/2010 | Gunnewiek et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0254627 A1 | 10/2010 | Panahpour Tehrani et al. |
| 2010/0259610 A1 | 10/2010 | Petersen et al. |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0281070 A1 | 11/2010 | Chan et al. |
| 2010/0289941 A1 | 11/2010 | Ito et al. |
| 2010/0290483 A1 | 11/2010 | Park et al. |

(56) References Cited

U.S. PATENT DOCUMENTS

| | | |
|---|---|---|
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu et al. |
| 2010/0321640 A1 | 12/2010 | Yeh et al. |
| 2010/0329556 A1 | 12/2010 | Mitarai et al. |
| 2011/0001037 A1 | 1/2011 | Tewinkle |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0085028 A1 | 4/2011 | Samadani et al. |
| 2011/0090217 A1 | 4/2011 | Mashitani et al. |
| 2011/0108708 A1 | 5/2011 | Olsen et al. |
| 2011/0115886 A1 | 5/2011 | Nguyen |
| 2011/0121421 A1 | 5/2011 | Charbon |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0206291 A1* | 8/2011 | Kashani .............. A61B 3/12 382/255 |
| 2011/0207074 A1 | 8/2011 | Hall-Holt et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra |
| 2011/0222757 A1 | 9/2011 | Yeatman, Jr. et al. |
| 2011/0228142 A1 | 9/2011 | Brueckner |
| 2011/0228144 A1 | 9/2011 | Tian et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung |
| 2011/0255745 A1 | 10/2011 | Hodder et al. |
| 2011/0261993 A1 | 10/2011 | Weiming et al. |
| 2011/0267264 A1 | 11/2011 | McCarthy et al. |
| 2011/0267348 A1 | 11/2011 | Lin |
| 2011/0273531 A1 | 11/2011 | Ito et al. |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim, II et al. |
| 2012/0012748 A1 | 1/2012 | Pain et al. |
| 2012/0014456 A1 | 1/2012 | Martinez Bauza et al. |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando et al. |
| 2012/0056982 A1 | 3/2012 | Katz et al. |
| 2012/0057040 A1 | 3/2012 | Park et al. |
| 2012/0062697 A1 | 3/2012 | Treado et al. |
| 2012/0062702 A1 | 3/2012 | Jiang et al. |
| 2012/0062756 A1 | 3/2012 | Tian |
| 2012/0069235 A1 | 3/2012 | Imai |
| 2012/0081519 A1 | 4/2012 | Goma |
| 2012/0086803 A1 | 4/2012 | Malzbender et al. |
| 2012/0105691 A1 | 5/2012 | Waqas et al. |
| 2012/0113232 A1 | 5/2012 | Joblove et al. |
| 2012/0113318 A1 | 5/2012 | Galstian et al. |
| 2012/0113413 A1 | 5/2012 | Miahczylowicz-Wolski et al. |
| 2012/0127275 A1 | 5/2012 | Von Zitzewitz et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1* | 6/2012 | Sasaki .............. G11B 27/105 386/239 |
| 2012/0163672 A1 | 6/2012 | McKinnon |
| 2012/0169433 A1 | 7/2012 | Mullins |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0274626 A1 | 11/2012 | Hsieh et al. |
| 2012/0287291 A1 | 11/2012 | McMahon et al. |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307093 A1 | 12/2012 | Miyoshi |
| 2012/0307099 A1 | 12/2012 | Yahata et al. |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |

(56) References Cited

U.S. PATENT DOCUMENTS

| | | |
|---|---|---|
| 2013/0033579 A1 | 2/2013 | Wajs |
| 2013/0033585 A1 | 2/2013 | Li et al. |
| 2013/0038696 A1 | 2/2013 | Ding et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0107061 A1 | 5/2013 | Kumar et al. |
| 2013/0113899 A1 | 5/2013 | Morohoshi et al. |
| 2013/0113939 A1 | 5/2013 | Strandemar |
| 2013/0120605 A1 | 5/2013 | Georgiev et al. |
| 2013/0121559 A1 | 5/2013 | Hu |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1* | 5/2013 | Bares ............... G06T 13/20 345/473 |
| 2013/0147979 A1 | 6/2013 | McMahon et al. |
| 2013/0176394 A1 | 7/2013 | Tian et al. |
| 2013/0208138 A1 | 8/2013 | Li |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0223759 A1 | 8/2013 | Nishiyama et al. |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By et al. |
| 2013/0293760 A1 | 11/2013 | Nisenzon et al. |
| 2014/0002674 A1 | 1/2014 | Duparre et al. |
| 2014/0009586 A1 | 1/2014 | McNamer et al. |
| 2014/0013273 A1 | 1/2014 | Ng et al. |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0092281 A1 | 4/2014 | Nisenzon et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0132810 A1 | 5/2014 | McMahon |
| 2014/0146201 A1 | 5/2014 | Knight et al. |
| 2014/0176592 A1 | 6/2014 | Wilburn et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267890 A1 | 9/2014 | Lelescu et al. |
| 2014/0285675 A1 | 9/2014 | Mullis |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085174 A1 | 3/2015 | Shabtay et al. |
| 2015/0091900 A1 | 4/2015 | Yang et al. |
| 2015/0104101 A1 | 4/2015 | Bryant et al. |
| 2015/0122411 A1 | 5/2015 | Rodda et al. |
| 2015/0124113 A1 | 5/2015 | Rodda et al. |
| 2015/0124151 A1 | 5/2015 | Rodda et al. |
| 2015/0146029 A1 | 5/2015 | Venkataraman et al. |
| 2015/0146030 A1 | 5/2015 | Venkataraman et al. |
| 2015/0199793 A1 | 7/2015 | Lelescu et al. |
| 2015/0199841 A1 | 7/2015 | Venkataraman et al. |
| 2015/0243480 A1 | 8/2015 | Yamada et al. |
| 2015/0248744 A1 | 9/2015 | Hayasaka et al. |
| 2015/0254868 A1 | 9/2015 | Srikanth et al. |
| 2015/0296137 A1 | 10/2015 | Duparre et al. |
| 2015/0312455 A1 | 10/2015 | Venkataraman et al. |
| 2015/0326852 A1 | 11/2015 | Duparre et al. |
| 2015/0373261 A1 | 12/2015 | Rodda et al. |
| 2016/0037097 A1 | 2/2016 | Duparre |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0195733 A1 | 7/2016 | Lelescu et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0316140 A1 | 10/2016 | Nayar et al. |

(56) References Cited

U.S. PATENT DOCUMENTS

| | | |
|---|---|---|
| 2017/0006233 A1 | 1/2017 | Venkataraman et al. |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0163862 A1 | 6/2017 | Molina |
| 2017/0178363 A1 | 6/2017 | Venkataraman et al. |
| 2017/0187933 A1 | 6/2017 | Duparre |
| 2017/0365104 A1 | 12/2017 | McMahon et al. |
| 2018/0007284 A1 | 1/2018 | Venkataraman et al. |

FOREIGN PATENT DOCUMENTS

| | | |
|---|---|---|
| CN | 101010619 A | 8/2007 |
| CN | 101064780 A | 10/2007 |
| CN | 101102388 A | 1/2008 |
| CN | 101147392 A | 3/2008 |
| CN | 101427372 A | 5/2009 |
| CN | 101606086 A | 12/2009 |
| CN | 101883291 A | 11/2010 |
| CN | 102037717 A | 4/2011 |
| CN | 102375199 A | 3/2012 |
| CN | 104081414 A | 10/2014 |
| CN | 104081414 B | 8/2017 |
| CN | 107230236 A | 10/2017 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1734766 A2 | 12/2006 |
| EP | 2026563 A1 | 2/2009 |
| EP | 2104334 A1 | 9/2009 |
| EP | 2244484 A1 | 10/2010 |
| EP | 2336816 A2 | 6/2011 |
| EP | 2381418 A1 | 10/2011 |
| EP | 2761534 A1 | 8/2014 |
| GB | 2482022 A | 1/2012 |
| IN | 2708/CHENP/2014 A1 | 8/2015 |
| JP | 59-025483 | 2/1984 |
| JP | 64-037177 | 2/1989 |
| JP | 02-285772 A | 11/1990 |
| JP | 07-15457 A | 1/1995 |
| JP | 09181913 A | 7/1997 |
| JP | 11142609 A | 5/1999 |
| JP | 11223708 A | 8/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008258885 A | 10/2008 |
| JP | 2009132010 A | 6/2009 |
| JP | 2009300268 A | 12/2009 |
| JP | 2011017764 A | 1/2011 |
| JP | 2011030184 A | 2/2011 |
| JP | 2011109484 A | 6/2011 |
| JP | 2011523538 A | 8/2011 |
| JP | 2013526801 A | 6/2013 |
| JP | 2014521117 A | 8/2014 |
| JP | 2014535191 A | 12/2014 |
| JP | 6140709 B2 | 5/2017 |
| JP | 2017163587 | 9/2017 |
| KR | 20110097647 A | 8/2011 |
| TW | 200828994 A | 7/2008 |
| TW | 200939739 A | 9/2009 |
| WO | 2005057922 A1 | 6/2005 |
| WO | 2006039906 A2 | 4/2006 |
| WO | 2006039906 A3 | 9/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2011008443 A2 | 1/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015070105 A1 | 5/2015 |

(56) References Cited

FOREIGN PATENT DOCUMENTS

| WO | 2015074078 A1 | 5/2015 |
|---|---|---|
| WO | 2015081279 A1 | 6/2015 |

OTHER PUBLICATIONS

Extended European Search Report for European Application EP12782935.6, completed Aug. 28, 2014, dated Sep. 4, 2014, 7 Pgs.
Extended European Search Report for European Application EP12804266.0, Report Completed Jan. 27, 2015, dated Feb. 3, 2015, 6 Pgs.
Extended European Search Report for European Application EP12835041.0, Report Completed Jan. 28, 2015, dated Feb. 4, 2015, 7 Pgs.
Extended European Search Report for European Application EP13751714.0, completed Aug. 5, 2015, dated Aug. 18, 2015, 8 Pgs.
Extended European Search Report for European Application EP13810229.8, Report Completed Apr. 14, 2016, dated Apr. 21, 2016, 7 pgs.
Extended European Search Report for European Application No. 13830945.5, Search completed Jun. 28, 2016, dated Jul. 7, 2016, 14 Pgs.
Extended European Search Report for European Application No. 13841613.6, Search completed Jul. 18, 2016, dated Jul. 26, 2016, 8 Pgs.
Extended European Search Report for European Application No. 14763087.5, Search completed Dec. 7, 2016, dated Dec. 19, 2016, 9 Pgs.
Extended European Search Report for European Application No. 14860103.2, Search completed Feb. 23, 2017, dated Mar. 3, 2017, 7 Pgs.
Supplementary European Search Report for EP Application No. 13831768.0, Search completed May 18, 2016, dated May 30, 2016, 13 Pgs.
Extended European Search Report for EP Application No. 11781313.9, Completed Oct. 1, 2013, dated Oct. 8, 2013, 6 pgs.
International Preliminary Report on Patentability for International Application No. PCT/US2012/058093, dated Sep. 18, 2013, Mailed Oct. 22, 2013, 40 pgs.
International Preliminary Report on Patentability for International Application No. PCT/US2012/059813, dated Apr. 15, 2014, 7 pgs.
International Preliminary Report on Patentability for International Application No. PCT/US2013/059991, dated Mar. 17, 2015, Mailed Mar. 26, 2015, 8 pgs.
International Preliminary Report on Patentability for International Application PCT/US2013/056065, dated Feb. 24, 2015, Mailed Mar. 5, 2015, 4 Pgs.
International Preliminary Report on Patentability for International Application PCT/US2013/062720, dated Mar. 31, 2015, Mailed Apr. 9, 2015, 8 Pgs.
International Preliminary Report on Patentability for International Application PCT/US2013/024987, dated Aug. 12, 2014, Mailed Aug. 12, 2014, 13 Pgs.
International Preliminary Report on Patentability for International Application PCT/US2013/027146, completed Aug. 26, 2014, dated Sep. 4, 2014, 10 Pgs.
Joshi et al., "Synthetic Aperture Tracking: Tracking Through Occlusions", I CCV IEEE 11th International Conference on Computer Vision; Publication [online]. Oct. 2007 [retrieved Jul. 28, 2014]. Retrieved from the Internet: <URL: http:I/ieeexplore.ieee.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. I-103-I-110.
Kim et al., "Scene reconstruction from high spatio-angular resolution light fields", ACM Transactions on Graphics (TOG)—SIGGRAPH 2013 Conference Proceedings, vol. 32, Issue 4, Article 73, Jul. 21, 2013, 11 pages.
Kitamura et al., "Reconstruction of a high-resolution image on a compound-eye image-capturing system", Applied Optics, Mar. 10, 2004, vol. 43, No. 8, pp. 1719-1727.
Konolige, "Projected Texture Stereo", 2010 IEEE International Conference on Robotics and Automation, May 3-7, 2010, p. 148-155.
Krishnamurthy et al., "Compression and Transmission of Depth Maps for Image-Based Rendering", Image Processing, 2001, pp. 828-831.
Kubota et al., "Reconstructing Dense Light Field From Array of Multifocus Images for Novel View Synthesis", IEEE Transactions on Image Processing, vol. 16, No. 1, Jan. 2007, pp. 269-279.
Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.
Lai et al., "A Large-Scale Hierarchical Multi-View RGB-D Object Dataset", Proceedings—IEEE International Conference on Robotics and Automation, Conference Date May 9-13, 2011, 8 pgs., DOI:10.1109/ICRA.201135980382.
Lane et al., "A Survey of Mobile Phone Sensing", IEEE Communications Magazine, vol. 48, Issue 9, Sep. 2010, pp. 140-150.
Lee et al., "Electroactive Polymer Actuator for Lens-Drive Unit in Auto-Focus Compact Camera Module", ETRI Journal, vol. 31, No. 6, Dec. 2009, pp. 695-702.
Lee et al., "Nonlocal matting", CVPR 2011, Jun. 20-25, 2011, pp. 2193-2200.
Lensvector, "How LensVector Autofocus Works", 2010, printed Nov. 2, 2012 from http://www.lensvector.com/overview.html, 1 pg.
Levin et al., "A Closed Form Solution to Natural Image Matting", Pattern Analysis and Machine Intelligence, Dec. 18, 2007, vol. 30, Issue 2, 8 pgs.
Levin et al., "Spectral Matting", 2007 IEEE Conference on Computer Vision and Pattern Recognition, Jun. 17-22, 2007, Minneapolis, MN, USA, pp. 1-8.
Levoy, "Light Fields and Computational Imaging", IEEE Computer Society, Sep. 1, 2006, vol. 39, Issue No. 8, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Li et al., "Fusing Images With Different Focuses Using Support Vector Machines", IEEE Transactions on Neural Networks, vol. 15, No. 6, Nov. 8, 2004, pp. 1555-1561.
Lim, "Optimized Projection Pattern Supplementing Stereo Systems", 2009 IEEE International Conference on Robotics and Automation, May 12-17, 2009, pp. 2823-2829.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
McGuire et al., "Defocus video matting", ACM Transactions on Graphics (TOG)—Proceedings of ACM SIGGRAPH 2005, vol. 24, Issue 3, Jul. 2005, pp. 567-576.
Merkle et al., "Adaptation and optimization of coding algorithms for mobile 3DTV", Mobile3DTV Project No. 216503, Nov. 2008, 55 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pages.

(56) References Cited

OTHER PUBLICATIONS

Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 14, 2006, pp. 30-38.
Ng, "Digital Light Field Photography", Thesis, Jul. 2006, 203 pgs.
Ng et al., "Light Field Photography with a Hand-held Plenoptic Camera", Stanford Tech Report CTSR Feb. 2005, Apr. 20, 2005, pp. 1-11.
Ng et al., "Super-Resolution Image Restoration from Blurred Low-Resolution Images", Journal of Mathematical Imaging and Vision, 2005, vol. 23, pp. 367-378.
Nguyen et al., "Error Analysis for Image-Based Rendering with Depth Information", IEEE Transactions on Image Processing, vol. 18, Issue 4, Apr. 2009, pp. 703-716.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.
Nishihara, "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "Super-Resolution Image Reconstruction", IEEE Signal Processing Magazine, May 2003, pp. 21-36.
Parkkinen et al., "Characteristic Spectra of Munsell Colors", Journal of the Optical Society of America A, vol. 6, Issue 2, Feb. 1989, pp. 318-322.
Perwass et al., "Single Lens 3D-Camera with Extended Depth-of-Field", printed from www.raytrix.de, Jan. 22, 2012, 15 pgs.
Pham et al., "Robust Super-Resolution without Regularization", Journal of Physics: Conference Series 124, Jul. 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs., Feb. 15, 2008.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "A perceptually motivated online benchmark for image matting", 2009 IEEE Conference on Computer Vision and Pattern Recognition, Jun. 20-25, 2009, Miami, FL, USA, pp. 1826-1833.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
International Preliminary Report on Patentability for International Application PCT/US2013/039155, completed Nov. 4, 2014, dated Nov. 13, 2014, 10 Pgs.
International Preliminary Report on Patentability for International Application PCT/US2013/046002, dated Dec. 31, 2014, Mailed Jan. 8, 2015, 6 Pgs.
International Preliminary Report on Patentability for International Application PCT/US2013/048772, dated Dec. 31, 2014, Mailed Jan. 8, 2015, 8 Pgs.
International Preliminary Report on Patentability for International Application PCT/US2013/056502, dated Feb. 24, 2015, Mailed Mar. 5, 2015, 7 Pgs.
International Preliminary Report on Patentability for International Application PCT/US2013/069932, dated May 19, 2015, Mailed May 28, 2015, 12 Pgs.
International Preliminary Report on Patentability for International Application PCT/US2014/017766, dated Aug. 25, 2015, Mailed Sep. 3, 2015, 8 Pgs.
International Preliminary Report on Patentability for International Application PCT/US2014/018084, dated Aug. 25, 2015, Mailed Sep. 3, 2015, 11 Pgs.
International Preliminary Report on Patentability for International Application PCT/US2014/018116, dated Sep. 15, 2015, Mailed Sep. 24, 2015, 12 Pgs.
International Preliminary Report on Patentability for International Application PCT/US2014/021439, dated Sep. 15, 2015, Mailed Sep. 24, 2015, 9 Pgs.
International Preliminary Report on Patentability for International Application PCT/US2014/022118, dated Sep. 8, 2015, Mailed Sep. 17, 2015, 4 pgs.
International Preliminary Report on Patentability for International Application PCT/US2014/022123, dated Sep. 8, 2015, Mailed Sep. 17, 2015, 4 Pgs.
International Preliminary Report on Patentability for International Application PCT/US2014/022774, dated Sep. 22, 2015, Mailed Oct. 1, 2015, 5 Pgs.
International Preliminary Report on Patentability for International Application PCT/US2014/023762, dated Mar. 2, 2015, Mailed Mar. 9, 2015, 10 Pgs.
International Preliminary Report on Patentability for International Application PCT/US2014/024407, dated Sep. 15, 2015, Mailed Sep. 24, 2015, 8 Pgs.
International Preliminary Report on Patentability for International Application PCT/US2014/024903, dated Sep. 15, 2015, Mailed Sep. 24, 2015, 12 Pgs.
International Preliminary Report on Patentability for International Application PCT/US2014/024947, dated Sep. 15, 2015, Mailed Sep. 24, 2015, 7 Pgs.
International Preliminary Report on Patentability for International Application PCT/US2014/025100, dated Sep. 15, 2015, Mailed Sep. 24, 2015, 4 Pgs.
International Preliminary Report on Patentability for International Application PCT/US2014/025904, dated Sep. 15, 2015, Mailed Sep. 24, 2015, 5 Pgs.
International Preliminary Report on Patentability for International Application PCT/US2014/028447, dated Sep. 15, 2015, Mailed Sep. 24, 2015, 7 Pgs.
International Preliminary Report on Patentability for International Application PCT/US2014/030692, dated Sep. 15, 2015, Mailed Sep. 24, 2015, 6 Pgs.
International Preliminary Report on Patentability for International Application PCT/US2014/064693, dated May 10, 2016, Mailed May 19, 2016, 14 Pgs.
International Preliminary Report on Patentability for International Application PCT/US2014/066229, dated May 24, 2016, Mailed Jun. 6, 2016, 9 Pgs.
International Preliminary Report on Patentability for International Application PCT/US2014/067740, dated May 31, 2016, Mailed Jun. 9, 2016, 9 Pgs.

(56) References Cited

OTHER PUBLICATIONS

International Preliminary Report on Patentability for International Application PCT/US2015/019529, dated Sep. 13, 2016, Mailed Sep. 22, 2016, 9 Pgs.
International Preliminary Report on Patentability for International Application PCT/US2010/057661, dated May 22, 2012, mailed May 31, 2012, 10 pgs.
International Preliminary Report on Patentability for International Application PCT/US2011/036349, dated Nov. 13, 2012, Mailed Nov. 22, 2012, 9 pgs.
International Search Report and Written Opinion for International Application No. PCT/US2013/046002, completed Nov. 13, 2013, dated Nov. 29, 2013, 7 pgs.
International Search Report and Written Opinion for International Application No. PCT/US2013/056065, Completed Nov. 25, 2013, dated Nov. 26, 2013, 8 pgs.
International Search Report and Written Opinion for International Application No. PCT/US2013/059991, Completed Feb. 6, 2014, dated Feb. 26, 2014, 8 pgs.
International Search Report and Written Opinion for International Application No. PCT/US2011/064921, Completed Feb. 25, 2011, dated Mar. 6, 2012, 17 pgs.
International Search Report and Written Opinion for International Application No. PCT/US2013/024987, Completed Mar. 27, 2013, dated Apr. 15, 2013, 14 pgs.
International Search Report and Written Opinion for International Application No. PCT/US2013/027146, completed Apr. 2, 2013, dated Apr. 19, 2013, 11 pgs.
International Search Report and Written Opinion for International Application No. PCT/US2013/039155, completed Jul. 1, 2013, dated Jul. 11, 2013, 11 Pgs.
International Search Report and Written Opinion for International Application No. PCT/US2013/048772, Completed Oct. 21, 2013, dated Nov. 8, 2013, 6 pgs.
International Search Report and Written Opinion for International Application No. PCT/US2013/056502, Completed Feb. 18, 2014, dated Mar. 19, 2014, 7 pgs.
International Search Report and Written Opinion for International Application No. PCT/US2013/069932, Completed Mar. 14, 2014, dated Apr. 14, 2014, 12 pgs.
International Search Report and Written Opinion for International Application No. PCT/US2015/019529, completed May 5, 2015, dated Jun. 8, 2015, 11 Pgs.
International Search Report and Written Opinion for International Application PCT/US2011/036349, completed Aug. 11, 2011, dated Aug. 22, 2011, 11 pgs.
International Search Report and Written Opinion for International Application PCT/US2013/062720, completed Mar. 25, 2014, dated Apr. 21, 2014, 9 Pgs.
International Search Report and Written Opinion for International Application PCT/US2014/017766, completed May 28, 2014, dated Jun. 18, 2014, 9 Pgs.
International Search Report and Written Opinion for International Application PCT/US2014/018084, completed May 23, 2014, dated Jun. 10, 2014, 12 Pgs.
International Search Report and Written Opinion for International Application PCT/US2014/018116, completed May 13, 2014, dated Jun. 2, 2014, 12 Pgs.
International Search Report and Written Opinion for International Application PCT/US2014/021439, completed Jun. 5, 2014, dated Jun. 20, 2014, 10 Pgs.
International Search Report and Written Opinion for International Application PCT/US2014/022118, completed Jun. 9, 2014, dated Jun. 25, 2014, 5 pgs.
International Search Report and Written Opinion for International Application PCT/US2014/022774 report completed Jun. 9, 2014, dated Jul. 14, 2014, 6 Pgs.
International Search Report and Written Opinion for International Application PCT/US2014/024407, report completed Jun. 11, 2014, dated Jul. 8, 2014, 9 Pgs.
International Search Report and Written Opinion for International Application PCT/US2014/025100, report completed Jul. 7, 2014, dated Aug. 7, 2014, 5 Pgs.
International Search Report and Written Opinion for International Application PCT/US2014/025904 report completed Jun. 10, 2014, dated Jul. 10, 2014, 6 Pgs.
International Search Report and Written Opinion for International Application PCT/US2009/044687, completed Jan. 5, 2010, dated Jan. 13, 2010, 9 pgs.
International Search Report and Written Opinion for International Application PCT/US2010/057661, completed Mar. 9, 2011, dated Mar. 17, 2011, 14 pgs.
International Search Report and Written Opinion for International Application PCT/US2012/037670, Completed Jul. 5, 2012, dated Jul. 18, 2012, 9 pgs.
International Search Report and Written Opinion for International Application PCT/US2012/044014, completed Oct. 12, 2012, dated Oct. 26, 2012, 15 pgs.
International Search Report and Written Opinion for International Application PCT/US2012/056151, completed Nov. 14, 2012, dated Nov. 30, 2012, 10 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
Seitz et al., "Plenoptic Image Editing", International Journal of Computer Vision 48, Conference Date Jan. 7, 1998, 29 pgs., DOI: 10.1109/ICCV.1998.710696.
Shotton et al., "Real-time human pose recognition in parts from single depth images", CVPR 2011, Jun. 20-25, 2011, Colorado Springs, CO, USA, pp. 1297-1304.
Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5, 2014.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pages.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.

(56) References Cited

OTHER PUBLICATIONS

Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Taylor, "Virtual camera movement: The way of the future?", American Cinematographer vol. 77, No. 9, Sep. 1996, 93-100.
Tseng et al., "Automatic 3-D depth recovery from a single urban-scene image", 2012 Visual Communications and Image Processing, Nov. 27-30, 2012, San Diego, CA, USA, pp. 1-6.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Maryland, College Park—Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, Nov. 1, 2013, pp. 1-13.
Vetro et al., "Coding Approaches for End-To-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008, 5 pages.
Wang et al., "Automatic Natural Video Matting with Depth", 15th Pacific Conference on Computer Graphics and Applications, PG '07, Oct. 29-Nov. 2, 2007, Maui, HI, USA, pp. 469-472.
Wang, "Calculation of Image Position, Size and Orientation Using First Order Properties", Dec. 29, 2010, OPTI521 Tutorial, 10 pgs.
Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pages, published Aug. 5, 2007.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, Mar. 11, 2005, vol. 5674, 12 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Wu et al., "A virtual view synthesis algorithm based on image inpainting", 2012 Third International Conference on Networking and Distributed Computing, Hangzhou, China, Oct. 21-24, 2012, pp. 153-156.
Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Yang et al., "A Real-Time Distributed Light Field Camera", Eurographics Workshop on Rendering (2002), published Jul. 26, 2002, pp. 1-10.
Yang et al., "Superresolution Using Preconditioned Conjugate Gradient Method", Proceedings of SPIE—The International Society for Optical Engineering, Jul. 2002, 8 pgs.
Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
Zhang et al., "A Self-Reconfigurable Camera Array", Eurographics Symposium on Rendering, published Aug. 8, 2004, 12 pgs.
Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zheng et al., "Balloon Motion Estimation Using Two Frames", Proceedings of the Asilomar Conference on Signals, Systems and Computers, IEEE, Comp. Soc. Press, US, vol. 2 of 02, Nov. 4, 1991, pp. 1057-1061.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
Zomet et al., "Robust Super-Resolution", IEEE, 2001, pp. 1-6.
Debevec et al., "Recovering High Dynamic Range Radiance Maps from Photographs", Computer Graphics (ACM SIGGRAPH Proceedings), Aug. 16, 1997, 10 pgs.
Do, "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., "Immersive Visual Communication", IEEE Signal Processing Magazine, vol. 28, Issue 1, Jan. 2011, DOI: 10.1109/MSP.2010.939075, Retrieved from: http://minhdo.ece.illinois.edu/publications/ImmerComm_SPM.pdf, pp. 58-66.
Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.
Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.
Drouin et al., "Improving Border Localization of Multi-Baseline Stereo Using Border-Cut", International Journal of Computer Vision, Jul. 5, 2006, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, Nov. 21, 2008, vol. 3, pp. 1-6.

(56) References Cited

OTHER PUBLICATIONS

Duparre et al., "Artificial compound eyes—different concepts and their application to ultra flat image acquisition sensors", MOEMS and Miniaturized Systems IV, Proc. SPIE 5346, Jan. 24, 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, Apr. 6, 2006, vol. 1, pp. R1-R16.
Duparre et al., "Microoptical artificial compound eyes—from design to experimental verification of two different concepts", Proc. of SPIE, Optical Design and Engineering II, vol. 5962, Oct. 17, 2005, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, Apr. 21, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Apposition Compound Eyes", 10th Microoptics Conference, Sep. 1-3, 2004, 2 pgs.
Eng, Wei Yong et al., "Gaze correction for 3D tele-immersive communication system", IVMSP Workshop, 2013 IEEE 11th. IEEE, Jun. 10, 2013.
Fanaswala, "Regularized Super-Resolution of Multi-View Images", Retrieved on Nov. 10, 2012 (Oct. 11, 2012). Retrieved from the Internet at URL:<http://www.site.uottawa.ca/-edubois/theses/Fanaswala_thesis.pdf>, Aug. 2009, 163 pgs.
Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.
Farrell et al., "Resolution and Light Sensitivity Tradeoff with Pixel Size", Proceedings of the SPIE Electronic Imaging 2006 Conference, Feb. 2, 2006, vol. 6069, 8 pgs.
Farsiu et al., "Advances and Challenges in Super-Resolution", International Journal of Imaging Systems and Technology, Aug. 12, 2004, vol. 14, pp. 47-57.
Farsiu et al., "Fast and Robust Multiframe Super Resolution", IEEE Transactions on Image Processing, Oct. 2004, published Sep. 3, 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.

Fischer et al., "Optical System Design", 2nd Edition, SPIE Press, Feb. 14, 2008, pp. 191-198.
Fischer et al., "Optical System Design", 2nd Edition, SPIE Press, Feb. 14, 2008, pp. 49-58.
Gastal et al., "Shared Sampling for Real-Time Alpha Matting", Computer Graphics Forum, EUROGRAPHICS 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Goldman et al., "Video Object Annotation, Navigation, and Composition", In Proceedings of UIST 2008, Oct. 19-22, 2008, Monterey CA, USA, pp. 3-12.
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Hacohen et al., "Non-Rigid Dense Correspondence with Applications for Image Enhancement", ACM Transactions on Graphics, vol. 30, No. 4, Aug. 7, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Search-and-Replace Editing for Personal Photo Collections", 2010 International Conference: Computational Photography (ICCP) Mar. 2010, pp. 1-8.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
HOLOEYE Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
HOLOEYE Photonics AG, "Spatial Light Modulators", Sep. 18, 2013, retrieved from https://web.archive.org/web/20130918113140/http://holoeye.com/spatial-light-modulators/ on Oct. 13, 2017, 4 pages.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horisaki et al., "Superposition Imaging for Three-Dimensionally Space-Invariant Point Spread Functions", Applied Physics Express, Oct. 13, 2011, vol. 4, pp. 112501-1-112501-3.
Horn et al., "LightShop: Interactive Light Field Manipulation and Rendering", In Proceedings of I3D, Jan. 1, 2007, pp. 121-128.
Isaksen et al., "Dynamically Reparameterized Light Fields", In Proceedings of SIGGRAPH 2000, pp. 297-306.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), vol. 1, Jun. 17-22, 2006, New York, NY, USA, pp. 371-378.
International Search Report and Written Opinion for International Application PCT/US2012/058093, completed Nov. 15, 2012, dated Nov. 29, 2012, 12 pgs.
International Search Report and Written Opinion for International Application PCT/US2012/059813, completed Dec. 17, 2012, dated Jan. 7, 2013, 8 pgs.

(56) References Cited

OTHER PUBLICATIONS

International Search Report and Written Opinion for International Application PCT/US2014/022123, completed Jun. 9, 2014, dated Jun. 25, 2014, 5 pgs.
International Search Report and Written Opinion for International Application PCT/US2014/023762, Completed May 30, 2014, dated Jul. 3, 2014, 6 Pgs.
International Search Report and Written Opinion for International Application PCT/US2014/024903, completed Jun. 12, 2014, dated, Jun. 27, 2014, 13 pgs.
International Search Report and Written Opinion for International Application PCT/US2014/024947, Completed Jul. 8, 2014, dated Aug. 5, 2014, 8 Pgs.
International Search Report and Written Opinion for International Application PCT/US2014/028447, completed Jun. 30, 2014, dated Jul. 21, 2014, 8 Pgs.
International Search Report and Written Opinion for International Application PCT/US2014/030692, completed Jul. 28, 2014, dated Aug. 27, 2014, 7 Pgs.
International Search Report and Written Opinion for International Application PCT/US2014/064693, Completed Mar. 7, 2015, dated Apr. 2, 2015, 15 pgs.
International Search Report and Written Opinion for International Application PCT/US2014/066229, Completed Mar. 6, 2015, dated Mar. 19, 2015, 9 Pgs.
International Search Report and Written Opinion for International Application PCT/US2014/067740, Completed Jan. 29, 2015, dated Mar. 3, 2015, 10 pgs.
Office Action for U.S. Appl. No. 12/952,106, dated Aug. 16, 2012, 12 pgs.
"Exchangeable image file format for digital still cameras: Exif Version 2.2", Japan Electronics and Information Technology Industries Association, Prepared by Technical Standardization Committee on AV & IT Storage Systems and Equipment, JEITA CP-3451, Apr. 2002, Retrieved from: http://www.exif.org/Exif2-2.PDF, 154 pgs.
"File Formats Version 6", Alias Systems, 2004, 40 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
Aufderheide et al., "A MEMS-based Smart Sensor System for Estimation of Camera Pose for Computer Vision Applications", Research and Innovation Conference 2011, Jul. 29, 2011, pp. 1-10.
Baker et al., "Limits on Super-Resolution and How to Break Them", IEEE Transactions on Pattern Analysis and Machine Intelligence, Sep. 2002, vol. 24, No. 9, pp. 1167-1183.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bennett et al., "Multispectral Bilateral Video Fusion", 2007 IEEE Transactions on Image Processing, vol. 16, No. 5, May 2007, published Apr. 16, 2007, pp. 1185-1194.
Bennett et al., "Multispectral Video Fusion", Computer Graphics (ACM SIGGRAPH Proceedings), Jul. 25, 2006, published Jul. 30, 2006, 1 pg.
Bertero et al., "Super-resolution in computational imaging", Micron, Jan. 1, 2003, vol. 34, Issues 6-7, 17 pgs.
Bishop et al., "Full-Resolution Depth Map Estimation from an Aliased Plenoptic Light Field", ACCV Nov. 8, 2010, Part II, LNCS 6493, pp. 186-200.
Bishop et al., "Light Field Superresolution", Computational Photography (ICCP), 2009 IEEE International Conference, Conference Date Apr. 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Borman, "Topics in Multiframe Superresolution Restoration", Thesis of Sean Borman, Apr. 2004, 282 pgs.
Borman et al, "Image Sequence Processing", Dekker Encyclopedia of Optical Engineering, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 28, 1998, vol. 3653, 10 pgs.
Borman et al., "Image Resampling and Constraint Formulation for Multi-Frame Super-Resolution Restoration", Proc. SPIE, published Jul. 1, 2003, vol. 5016, 12 pgs.
Borman et al., "Linear models for multi-frame super-resolution restoration under non-affine registration and spatially varying PSF", Proc. SPIE, May 21, 2004, vol. 5299, 12 pgs.
Borman et al., "Nonlinear Prediction Methods for Estimation of Clique Weighting Parameters in NonGaussian Image Models", Proc. SPIE, Sep. 22, 1998, vol. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, Aug. 2006, vol. 15, Issue 8, published Jul. 17, 2006, pp. 2239-2248.
Boye et al., "Comparison of Subpixel Image Registration Algorithms", Proc. of SPIE—IS&T Electronic Imaging, Feb. 3, 2009, vol. 7246, pp. 72460X-1-72460X-9; doi: 10.1117/12.810369.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, May 13, 2010, 11 pgs.
Bruckner et al., "Thin wafer-level camera lenses inspired by insect compound eyes", Optics Express, Nov. 22, 2010, vol. 18, No. 24, pp. 24379-24394.
Bryan et al., "Perspective Distortion from Interpersonal Distance is an Implicit Visual Cue for Social Judgments of Faces", PLOS One, vol. 7, Issue 9, Sep. 26, 2012, e45301, doi:10.1371/journal.pone.0045301, 9 pages.
Capel, "Image Mosaicing and Super-resolution", Retrieved on Nov. 10, 2012, Retrieved from the Internet at URL:<http://citeseerx.ist.psu.edu/viewdoc/download?doi=10.1.1.226.2643&rep=rep1&type=pdf>, Trinity Term 2001, 269 pgs.
Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.
Chan et al., "Investigation of Computational Compound-Eye Imaging System with Super-Resolution Reconstruction", IEEE, ICASSP, Jun. 19, 2006, pp. 1177-1180.
Chan et al., "Super-resolution reconstruction in a computational compound-eye imaging system", Multidim Syst Sign Process, published online Feb. 23, 2007, vol. 18, pp. 83-101.
Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.
Chen et al., "Interactive deformation of light fields", In Proceedings of SIGGRAPH I3D, Apr. 3, 2005, pp. 139-146.
Chen et al., "KNN Matting", IEEE Transactions on Pattern Analysis and Machine Intelligence, Sep. 2013, vol. 35, No. 9, pp. 2175-2188.
Cooper et al., "The perceptual basis of common photographic practice", Journal of Vision, vol. 12, No. 5, Article 8, May 25, 2012, pp. 1-14.
Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pages 1-5a.
Robert et al., "Dense Depth Map Reconstruction: A Minimization and Regularization Approach which Preserves Discontinuities", European Conference on Computer Vision (ECCV), pp. 439-451, 1996.
Van Der Wal et al., "The Acadia Vision Processor", Proceedings Fifth IEEE International Workshop on Computer Architectures for Machine Perception, Sep. 13, 2000, Padova, Italy, pp. 31-40.

* cited by examiner

SYSTEMS AND METHODS FOR GENERATING COMPRESSED LIGHT FIELD REPRESENTATION DATA USING CAPTURED LIGHT FIELDS, ARRAY GEOMETRY, AND PARALLAX INFORMATION

CROSS-REFERENCE TO RELATED APPLICATIONS

The current application is a continuation of U.S. patent application Ser. No. 15/253,605, entitled "Systems and Methods for Generating Compressed Light Field Representation Data using Captured Light Fields, Array Geometry, and Parallax Information" to Venkataraman et al., filed on Aug. 31, 2016, which is a continuation of U.S. patent application Ser. No. 14/186,871, entitled "Systems and Methods for Generating Compressed Light Field Representation Data using Captured Light Fields, Array Geometry, and Parallax Information" to Venkataraman et al., filed on Feb. 21, 2014 and issued as U.S. Pat. No. 9,462,164, which claims priority to U.S. Provisional Patent Application Ser. No. 61/767,520, filed Feb. 21, 2013, and to U.S. Provisional Patent Application Ser. No. 61/786,976, filed Mar. 15, 2013, the disclosures of which are hereby incorporated by reference in their entirety.

FIELD OF THE INVENTION

The present invention relates to systems and methods for capturing light fields and more specifically to the efficient representation of captured light fields using compressed light field representation data.

BACKGROUND

Imaging devices, such as cameras, can be used to capture images of portions of the electromagnetic spectrum, such as the visible light spectrum, incident upon an image sensor. For ease of discussion, the term light is generically used to cover radiation across the entire electromagnetic spectrum. In a typical imaging device, light enters through an opening (aperture) at one end of the imaging device and is directed to an image sensor by one or more optical elements such as lenses. The image sensor includes pixels or sensor elements that generate signals upon receiving light via the optical element. Commonly used image sensors include charge-coupled device (CCDs) sensors and complementary metal-oxide semiconductor (CMOS) sensors.

Image sensors are devices capable of converting an image into a digital signal. Image sensors utilized in digital cameras are typically made up of an array of pixels. Each pixel in an image sensor is capable of capturing light and converting the captured light into electrical signals. In order to separate the colors of light and capture a color image, a Bayer filter is often placed over the image sensor, filtering the incoming light into its red, blue, and green (RGB) components that are then captured by the image sensor. The RGB signal captured by the image sensor using a Bayer filter can then be processed and a color image can be created.

SUMMARY OF THE INVENTION

Systems and methods for the generating compressed light field representation data using captured light fields in accordance embodiments of the invention are disclosed. In one embodiment, an array camera includes a processor and a memory connected to the processor and configured to store an image processing application, wherein the image processing application configures the processor to obtain image data, wherein the image data includes a set of images including a reference image and at least one alternate view image and each image in the set of images includes a set of pixels, generate a depth map based on the image data, where the depth map describes the distance from the viewpoint of the reference image with respect to objects imaged by pixels within the reference image, determine at least one prediction image based on the reference image and the depth map, where the prediction images correspond to at least one alternate view image, compute prediction error data based on the at least one prediction image and the at least one alternate view image, where a portion of prediction error data describes the difference in photometric information between a pixel in a prediction image and a pixel in at least one alternate view image corresponding to the prediction image, and generate compressed light field representation data based on the reference image, the prediction error data, and the depth map.

In an additional embodiment of the invention, the array camera further includes an array camera module including an imager array having multiple focal planes and an optics array configured to form images through separate apertures on each of the focal planes, wherein the array camera module is configured to communicate with the processor and wherein the obtained image data includes images captured by the imager array.

In another embodiment of the invention, the reference image corresponds to an image captured using one of the focal planes within the image array.

In yet another additional embodiment of the invention, the at least one alternate view image corresponds to the image data captured using the focal planes within the image array separate from the focal planes associated with the reference image.

In still another additional embodiment of the invention, the reference image corresponds to a virtual image formed based on the images in the array.

In another embodiment of the invention, the depth map describes the geometrical linkage between the pixels in the reference image and the pixels in the other images in the image array.

In yet still another additional embodiment of the invention, the image processing application configures the processor to perform a parallax detection process to generate the depth map, where the parallax detection process identifies variations in the position of objects within the image data along epipolar lines between the reference image and the at least one alternate view image.

In yet another embodiment of the invention, the image processing application further configures the processor to compress the generated compressed light field representation data.

In still another embodiment of the invention, the generated compressed light field representation data is compressed using JPEG-DX.

In yet still another embodiment of the invention, the image processing application configures the processor to determine prediction error data by identifying at least one pixel in the at least one alternative view image corresponding to a reference pixel in the reference image, determining fractional pixel locations within the identified at least one pixel, where a fractional pixel location maps to a plurality of pixels in at least one alternative view image, and mapping fractional pixel locations to a specific pixel location within the alternate view image having a determined fractional pixel location.

In yet another additional embodiment of the invention, the mapping fractional pixel locations is determined as the pixel being nearest neighbor within the alternative view image.

In still another additional embodiment of the invention, the image processing application configures the processor to map the fractional pixel locations based on the depth map, where the pixel in the alternate view image is likely to be similar based on its proximity to the corresponding pixel location determined using the depth map of the reference image.

In yet still another additional embodiment of the invention, the image processing application further configures the processor to identify areas of low confidence within the computed prediction images based on the at least one alternate view image, the reference image, and the depth map and an area of low confidence indicate areas where the information stored in a determined prediction image indicate areas in the reference viewpoint where the pixels in the determined prediction image may not photometrically correspond to the corresponding pixels in the alternate view image.

In another embodiment of the invention, the depth map further comprises a confidence map describing areas of low confidence within the depth map.

In yet another embodiment of the invention, the image processing application further configures the processor to disregard identified areas of low confidence.

In still another embodiment of the invention, the image processing application further configures the processor to identify at least one additional reference image within the image data, where the at least one additional reference image is separate from the reference image, determine at least one supplemental prediction image based on the reference image, the at least one additional reference image, and the depth map, and compute the supplemental prediction error data based on the at least one alternate additional reference image and the at least one supplemental prediction image, and the generated compressed light field representation data further includes the supplemental prediction error data.

In yet still another embodiment of the invention, the generated compressed light field representation data further includes the at least one additional reference image.

In yet another additional embodiment of the invention, the image processing application configures the processor to identify the at least one additional reference image by generating an initial additional reference image based on the reference image and the depth map, where the initial additional reference image includes pixels projected from the viewpoint of the reference image based on the depth map and forming the additional reference image based on the initial additional reference image and the prediction error data, where the additional reference image comprises pixels based on interpolations of pixels propagated from the reference image and the prediction error data.

In another embodiment of the invention, the prediction error data is decoded based on the reference image prior to the formation of the additional reference image.

Still another embodiment of the invention includes a method for generating compressed light field representation data including obtaining image data using an array camera, where the image data includes a set of images including a reference image and at least one alternate view image and the images in the set of images include a set of pixels, generating a depth map based on the image data using the array camera, where the depth map describes the distance from the viewpoint of the reference image with respect to objects imaged by pixels within the reference image based on the alternate view images, determining a set of prediction images based on the reference image and the depth map using the array camera, where a prediction image in the set of prediction images is a representation of a corresponding alternate view image in the at least one alternate view image, computing prediction error data by calculating the difference between a prediction image in the set of prediction images and the corresponding alternate view image that describes the difference in photometric information between a pixel in the reference image and a pixel in an alternate view image using the array camera, and generating compressed light field representation data based on the reference image, the prediction error data, and the depth map using the array camera.

In yet another additional embodiment of the invention, the reference image is a virtual image interpolated from a virtual viewpoint within the image data.

In still another additional embodiment of the invention, determining the set of predicted images further includes identifying at least one pixel in the at least one alternative view image corresponding to a reference pixel in the reference image using the array camera, determining fractional pixel locations within the identified at least one pixel using the array camera, where a fractional pixel location maps to a plurality of pixels in at least one alternative view image, and mapping fractional pixel locations to a specific pixel location within the alternate view image having a determined fractional pixel location using the array camera.

In yet still another embodiment of the invention, the method further includes identifying areas of low confidence within the computed prediction images based on the at least one alternate view image, the reference image, and the depth map using the array camera, where an area of low confidence indicate areas where the information stored in a determined prediction image indicate areas in the reference viewpoint where the pixels in the determined prediction image may not photometrically correspond to the corresponding pixels in the alternate view image.

In yet another additional embodiment of the invention, the method further includes identifying at least one additional reference image within the image data using the array camera, where the at least one additional reference image is separate from the reference image, determining at least one supplemental prediction image based on the reference image, the at least one additional reference image, and the depth map using the array camera, and computing the supplemental prediction error data based on the at least one alternate additional reference image and the at least one supplemental prediction image using the array camera, where the generated compressed light field representation data further includes the supplemental prediction error data.

In still another additional embodiment of the invention, identifying the at least one additional reference image includes generating an initial additional reference image based on the reference image and the depth map using the array camera, where the initial additional reference image includes pixels projected from the viewpoint of the reference image based on the depth map and forming the additional reference image based on the initial additional reference image and the prediction error data using the array camera, where the additional reference image comprises pixels based on interpolations of pixels propagated from the reference image and the prediction error data.

DETAILED DESCRIPTION

Figure 1:
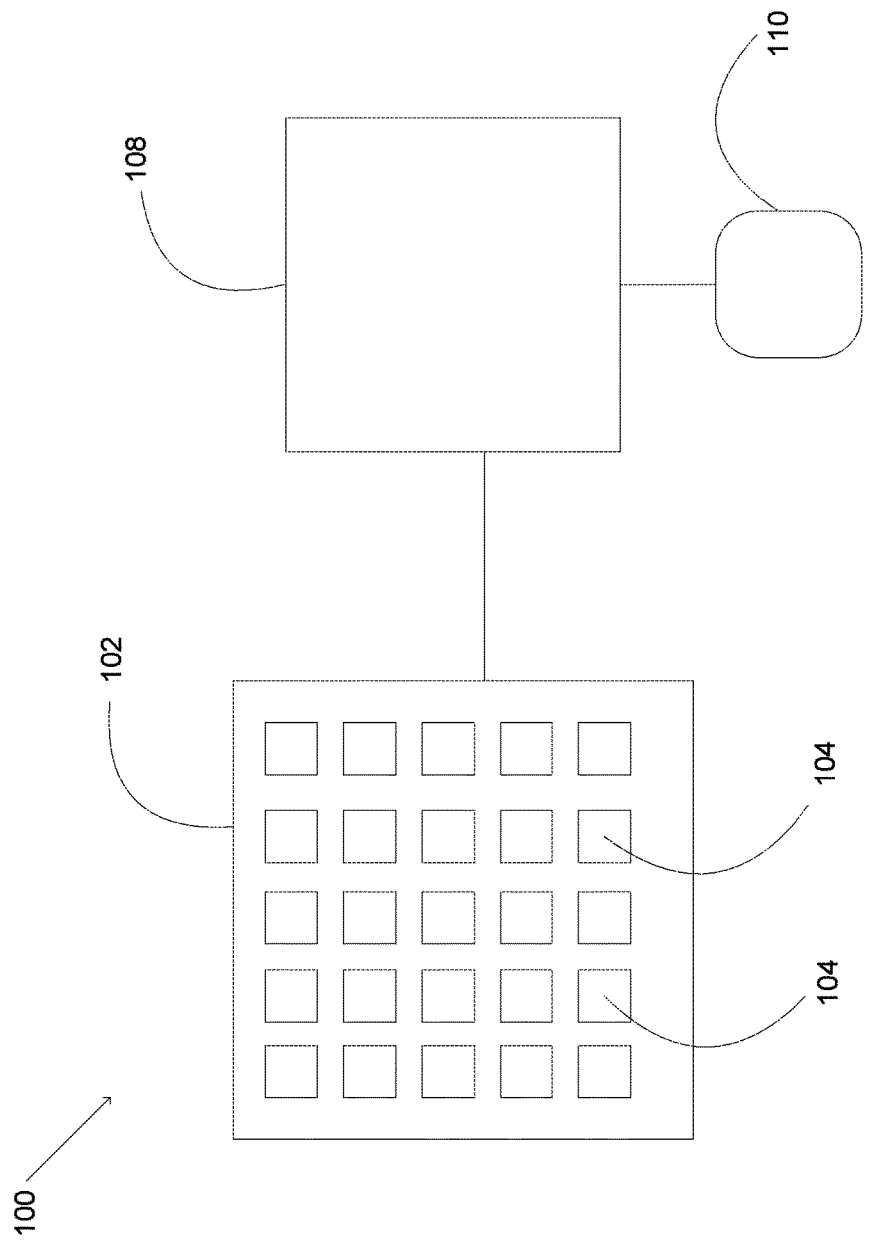
FIG. 1 is a system diagram of an array camera including a 5×5 imager array with storage hardware connected with a processor in accordance with an embodiment of the invention.

Turning now to the drawings, systems and methods for generating compressed light field representation data using captured light fields in accordance with embodiments of the invention are illustrated. Array cameras, such as those described in U.S. patent application Ser. No. 12/935,504, entitled "Capturing and Processing of Images using Monolithic Camera Array with Heterogeneous Imagers" to Venkataraman et al., can be utilized to capture light fields and store the captured light fields. Captured light fields contain image data from an array of images of a scene captured from multiple points of view so that each image samples the light field of the same region within the scene (as opposed to a mosaic of images that sample partially overlapping regions of a scene). It should be noted that any configuration of images, including two-dimensional arrays, non-rectangular arrays, sparse arrays, and subsets of arrays of images could be utilized as appropriate to the requirements of specific embodiments of the invention. In a variety of embodiments, image data for a specific image that forms part of a captured light field describes a two-dimensional array of pixels. Storing all of the image data for the images in a captured light field can consume a disproportionate amount of storage space, limiting the number of light field images that can be stored within a fixed capacity storage device and increasing the amount of data transfer involved in transmitting a captured light field. Array cameras in accordance with many embodiments of the invention are configured to process captured light fields and generate data describing correlations between the images in the captured light field. Based on the image correlation data, some or all of the image data in the captured light field can be discarded, affording more efficient storage of the captured light fields as compressed light field representation data. Additionally, this process can be decoupled from the capturing of light fields to enable the efficient use of the hardware resources present in the array camera.

In many embodiments, each image in a captured light field is from a different viewpoint. Due to the different viewpoint of each of the images, parallax results in variations in the position of objects within the images of the scene. The disparity between corresponding pixels in images in a captured light field can be utilized to determine the distance to an object imaged by the corresponding pixels. Conversely, distance can be used to estimate the location of a corresponding pixel in another image. Processes that can be utilized to detect parallax and generate depth maps in accordance with embodiments of the invention are disclosed in U.S. patent application Ser. No. 13/972,881 entitled "Systems and Methods for Parallax Detection and Correction in Images Captured Using Array Cameras that Contain Occlusions using Subsets of Images to Perform Depth Estimation" to Venkataraman et al. In many embodiments, a depth map is metadata describing the distance from the viewpoint from which an image is captured (or, in the case of super-resolution processing, synthesized) with respect to objects imaged by pixels within the image. Additionally, the depth map can also describe the geometrical linkage between pixels in the reference image and pixels in all other images in the array.

Array cameras in accordance with several embodiments of the invention are configured to process the images in a captured light field using a reference image selected from the captured array of images. In a variety of embodiments, the reference image is a synthetic image generated from the captured images, such as a synthetic viewpoint generated from a focal plane (e.g. a camera) that does not physically exist in the imager array. The remaining images can be considered to be images of alternate views of the scene relative to the viewpoint of the reference image. Using the reference image, array cameras in accordance with embodiments of the invention can generate a depth map using processes similar to those described above in U.S. patent application Ser. No. 13/972,881 and the depth map can be used to generate a set of prediction images describing the pixel positions within one or more of the alternate view images that correspond to specific pixels within the reference image. The relative locations of pixels in the alternate view images can be predicted along epipolar lines projected based on the configuration of the cameras (e.g. the calibration of the physical properties of the imager array in the array camera and their relationship to the reference viewpoint of the array camera) that captured the images. The predicted location of the pixels along the epipolar lines is a function of the distance from the reference viewpoint to the object imaged by the corresponding pixel in the reference image. In a number of embodiments, the predicted location is additionally a function of any calibration parameters intrinsic to or extrinsic to the physical imager array. The prediction images exploit the correlation between the images in the captured light field by describing the differences between the value of a pixel in the reference image and pixels adjacent to corresponding disparity-shifted pixel locations in the other alternate view images in the captured light field. The disparity-shifted pixel positions are often determined with fractional pixel precision (e.g. an integer position in the reference image is mapped to a fractional position in the alternate view image) based on a depth map of the reference image in the alternate view images. Significant compression of the image data forming the images of a captured light field can be achieved by selecting one reference image, generating prediction images with respect to the reference image using the depth map information relating the reference and alternate view images, generating prediction error data describing the differences between the predicted images and the alternate view images, and discarding the alternate view images. In a variety of embodiments, multiple reference images are utilized to generate prediction error data that describes the photometric differences between pixels in alternate view images adjacent to corresponding disparity-shifted pixel locations and pixels in one or more of the reference images.

It should also be noted that that while, in a variety of embodiments, the reference image corresponds to an image in the captured array of images, virtual (e.g. synthetic) images corresponding to a virtual viewpoint within the captured light field can also be utilized as the reference image in accordance with embodiments of the invention. For example, a virtual red image, a virtual green image, and/or a virtual blue image can be used to form a reference image for each respective color channel and used as a starting point for forming predicted images for the alternate view images of each respective color channel. In many embodiments, a color channel includes a set of images within the image array corresponding to a particular color, potentially as captured by the focal planes within the imager array. However, in accordance with embodiments of the invention, the reference image for a particular color channel can be taken from a different color channel; for example, an infrared image can be used as the reference image for the green channel within the captured light field.

The reference image(s) and the set of prediction error data stored by an array camera can be referred to as compressed light field representation data. The compressed light field representation data can also include the depth map utilized to generate the prediction error data and/or any other metadata related to the creation of the compressed light field representation data and/or the captured light field. The prediction error data can be compressed using any compression technique, such as discrete cosine transform (DCT) techniques, as appropriate to the requirements of specific embodiments of the invention. The compressed light field representation data can be compressed and stored in a variety of formats. One such file format is the JPEG-DX extension to ISO/IEC 10918-1 described in U.S. patent application Ser. No. 13/631,731, titled "Systems and Methods for Encoding Light Field Image Files" to Venkataraman et al. As can readily be appreciated, the prediction error data can be stored in a similar manner to a depth map as compressed or uncompressed layers and/or metadata within an image file. In a variety of embodiments, array cameras are configured to capture light fields separate from the generation of the compressed light field representation data. For example, the compressed light field representation data can be generated when the array camera is no longer capturing light fields or in the background as the array camera captures additional light fields. Any variety of decoupled processing techniques can be utilized in accordance with the requirements of embodiments of the invention. Many array cameras in accordance with embodiments of the invention are capable of performing a variety of processes that utilize the information contained in the captured light field using the compressed light field representation data.

In many instances, a captured light field contains image data from an array of images of a scene that sample an object space within the scene in such a way as to provide sampling diversity that can be utilized to synthesize higher resolution images of the object space using super-resolution processes. Systems and methods for performing super-resolution processing on image data captured by an array camera in accordance with embodiments of the invention are disclosed in U.S. patent application Ser. No. 12/967,807 entitled "System and Methods for Synthesizing High Resolution Images Using Super-Resolution Processes" to Lelescu et al. Synthesized high resolution images are representations of the scene captured in the captured light field. In many instances, the process of synthesizing a high resolution image may result in a single image, a stereoscopic pair of images that can be used to display three dimensional (3D) information via an appropriate 3D display, and/or a variety of images from different viewpoints. The process of synthesizing high resolution images from lower resolution image data captured by an array camera module in an array camera typically involves performing parallax detection and correction to reduce the effects of disparity between the images captured by each of the cameras in the array camera module. By using the reference image(s), the set of prediction error data, and/or the depth map contained in compressed light field representation data, high resolution images can be synthesized separately from the parallax detection and correction process, thereby alleviating the need to store and process the captured light field until the super-resolution process can be performed. Additionally, the parallax detection process can be optimized to improve speed or efficiency of compression. Once the compressed data is decoded, a parallax process can be re-run at a different (i.e. higher) precision using the reconstructed images. In this way, an initial super-resolution process can be performed in an efficient manner (such as on an array camera, where the processing power of the device limits the ability to perform a high precision parallax process in real-time) and, at a later time, a higher resolution parallax process can be performed to generate any of a variety of data, including a second set of compressed light field representation data and/or other captured light field image data, or perform any processing that relies on the captured light field. Later times include, but are not limited to, times when the array camera is not capturing light fields and/or when the compressed light field representation data has been transmitted to a separate image processing device with more advanced processing capabilities.

The disclosures of each of U.S. patent application Ser. Nos. 12/935,504, 12/967,807, 13/631,731, and 13/972,881 are hereby incorporated by reference in their entirety. Although the systems and methods described are with respect to array cameras configured to both capture and process captured light fields, devices that are configured to obtain captured light fields captured using a different device and process the received data can be utilized in accordance with the requirements of a variety of embodiments of the invention. Additionally, any of the various systems and processes described herein can be performed in sequence, in alternative sequences, and/or in parallel (e.g. on different computing devices) in order to achieve similar results in a manner that is more appropriate to the requirements of a specific application of the invention. Systems and methods for capturing light fields and generating compressed light field representation data using the captured light fields in accordance with embodiments of the invention are described below.

Array Camera Architectures

As described above, array cameras are capable of capturing and processing light fields and can be configured to generate compressed light field representation data using captured light fields in accordance with many embodiments of the invention. An array camera including an imager array in accordance with an embodiment of the invention is illustrated in FIG. 1. The array camera 100 includes an array camera module including an imager array 102 having multiple focal planes 104 and an optics array configured to form images through separate apertures on each of the focal planes. The imager array 102 is configured to communicate with a processor 108. In accordance with many embodiments of the invention, the processor 108 is configured to read out image data captured by the imager array 102 and generate compressed light field representation data using the image data captured by the imager array 102. Imager arrays including multiple focal planes are discussed in U.S. patent application Ser. No. 13/106,797, entitled "Architectures for System on Chip Array Cameras" to McMahon et al., the entirety of which is hereby incorporated by reference.

In the illustrated embodiment, the focal planes are configured in a 5×5 array. In other embodiments, any of a variety of array configurations can be utilized including linear arrays, non-rectangular arrays, and subsets of an array as appropriate to the requirements of specific embodiments of the invention. Each focal plane 104 of the imager array is capable of capturing image data from an image of the scene formed through a distinct aperture. Typically, each focal plane includes a plurality of rows of pixels that also forms a plurality of columns of pixels, and each focal plane is contained within a region of the imager that does not contain pixels from another focal plane. The pixels or sensor elements utilized in the focal planes can be individual light sensing elements such as, but not limited to, traditional CIS (CMOS Image Sensor) pixels, CCD (charge-coupled device) pixels, high dynamic range sensor elements, multi-spectral sensor elements, and/or any other structure configured to generate an electrical signal indicative of light incident on the structure. In many embodiments, the sensor elements of each focal plane have similar physical properties and receive light via the same optical channel and color filter (where present). In other embodiments, the sensor elements have different characteristics and, in many instances, the characteristics of the sensor elements are related to the color filter applied to each sensor element. In a variety of embodiments, a Bayer filter pattern of light filters can be applied to one or more of the focal planes 104. In a number of embodiments, the sensor elements are optimized to respond to light at a particular wavelength without utilizing a color filter. It should be noted that any optical channel, including those in non-visible portions of the electromagnetic spectrum (such as infrared) can be sensed by the focal planes as appropriate to the requirements of particular embodiments of the invention.

In several embodiments, information captured by one or more focal planes 104 is read out of the imager array 102 as packets of image data. In many embodiments, a packet of image data contains one or more pixels from a row of pixels captured from each of one or more of the focal planes 104. Packets of image data may contain other groupings of captured pixels, such as one or more pixels captured from a column of pixels in each of one or more focal planes 104 and/or a random sampling of pixels. Systems and methods for reading out image data from array cameras that can be utilized in array cameras configured in accordance with embodiments of the invention are described in U.S. Pat. No. 8,305,456, entitled "Systems and Methods for Transmitting and Receiving Array Camera Image Data" to McMahon, the entirety of which is hereby incorporated by reference. In several embodiments, the packets of image data are used to create a two-dimensional array of images representing the light field as captured from the one or more focal planes 104. In many embodiments, one or more of the images in the array of images are associated with a particular color; this color can be the same color associated with the focal plane 104 corresponding to the viewpoint of the image or a different color. The processor 108 can be configured to immediately process the captured light field from the one or more focal planes and/or the processor 108 can store the captured light field and later process the captured light field. In a number of embodiments, the processor 108 is configured to offload the captured light fields to an external device for processing.

The processing of captured light fields includes determining correspondences between pixels in the captured light field. In several embodiments, the pixels in the packets of image data are geometrically correlated based on a variety of factors, including, but not limited to, the characteristics of one or more of the focal planes 104. The calibration of imager arrays to determine the characteristics of focal planes are disclosed in U.S. patent application Ser. No. 12/967,807 incorporated by reference above. In several embodiments, processor 108 is configured (such as by an image processing application) to perform parallax detection on the captured light field to determine corresponding pixel locations along epipolar lines between a reference image and alternate view images within the captured light field. The process of performing parallax detection also involves generating a depth map with respect to the reference image (e.g. a reference viewpoint that may include synthesized 'virtual' viewpoints where a physical camera in the array does not exist). In a variety of embodiments, the captured packets of image data are associated with image packet timestamps and geometric calibration and/or photometric calibration between pixels in the packets of image data utilize the associated image packet timestamps. Corresponding pixel locations and differences between pixels in the reference image and the alternate view image(s) can be utilized by processor 108 to determine a prediction for at least some of the pixels of the alternate view image(s). In many embodiments, the corresponding pixel locations are determined with sub-pixel precision.

The prediction image can be formed by propagating pixels from the reference image(s) to the corresponding pixel locations in the alternate view grid. In many embodiments, the corresponding pixel locations in the alternate view grid are fractional positions (e.g. sub-pixel positions). Once the pixels from the reference image(s) are propagated to the corresponding positions in the alternate view grid, a predicted image (from the same perspective as the alternate view image) is formed by calculating prediction values for the integer grid points in the alternate view grid based on propagated pixel values from the reference image. The predicted image values in the integer grid of the alternate view image can be determined by interpolating from multiple pixels propagated from the reference image in the neighborhood of the integer pixel grid position in the predicted image. In many embodiments, the predicted image values on the integer grid points of the alternate view image are interpolated through an iterative interpolation schemes (e.g. a combination of linear or non-linear interpolations) that progressively fill in 'holes' or missing data at integer positions in the predicted alternate view image grid. In a variety of embodiments, integer grid locations in the predicted image can be filled using set selection criteria. In several embodiments, pixels propagated from the reference image within a particular radius of the integer pixel position can form a set, and the pixel in the set closest to the mean of the distribution of pixels in the region can be selected as the predictor. In a number of embodiments, within the same set, the pixel that lands nearest to the integer grid point may be used as the predictor (i.e. nearest neighbor interpolation). In another embodiment, an average of the N nearest neighbors may be used as the predicted image value at the integer grid point. However, it should be noted that the predicted value can be any function (linear or non-linear) that interpolates or inpaints values in the predicted image based on reference pixel values in some relationship of the integer grid position in the predicted image.

The prediction error data itself can be determined by performing a photometric comparison of the pixel values from the predicted image (e.g. the predicted alternate view image based on the reference image and the depth map) and the corresponding alternate view image. The prediction error data represents the difference between the predicted alternate view image based on the reference image and the depth map, and the actual alternate view image that must be later reproduced in the decoding process.

Due to variations in the optics and the pixels used to capture the image data, sampling diversity, and/or aliasing, the processor 108 is configured to anticipate photometric differences between corresponding pixels. These photometric differences may be further increased in the compared pixels because the nearest neighbor does not directly correspond to the pixel in the reference image. In many embodiments, the compression is lossless and the full captured light field can be reconstructed using the reference image, the depth map, and the prediction error data. In other embodiments, a lossy compression is used and an approximation of the full captured light field can be reconstructed. In this way, the pixel values of the alternate view images are available for use in super-resolution processing, enabling the super-resolution processes to exploit the sampling diversity and/or aliasing that may be reflected in the alternate view images. In a number of embodiments, the prediction images are sparse images. In several embodiments, sparse images contain predictions for some subset of points (e.g. pixels) in the space of the alternate view images. Processor 108 is further configured to generate compressed light field representation data using prediction error data, the reference image, and the depth map. Other data, such as one or more image packet timestamps, can be included as metadata associated with the compressed light field representation data as appropriate to the requirements of specific array cameras in accordance with embodiments of the invention. In several embodiments, the prediction error data and the reference image are compressed via lossless and/or lossy image compression techniques. In a variety of embodiments, an image processing application configures processor 108 to perform a variety of operations using the compressed light field representation data, including, but not limited to, synthesizing high resolution images using a super-resolution process. Other operations can be performed using the compressed light field representation data in accordance with a variety of embodiments of the invention.

Although a specific array camera configured to capture light fields and generate compressed light field representation data is illustrated in FIG. 1, alternative architectures, including those containing sensors measuring the movement of the array camera as light fields are captured, can also be utilized as appropriate to the requirements of specific applications in accordance with embodiments of the invention. Systems and methods for capturing and processing light fields in accordance with embodiments of the invention are discussed below.

Processing and Interacting with Captured Light Fields

Figure 2:
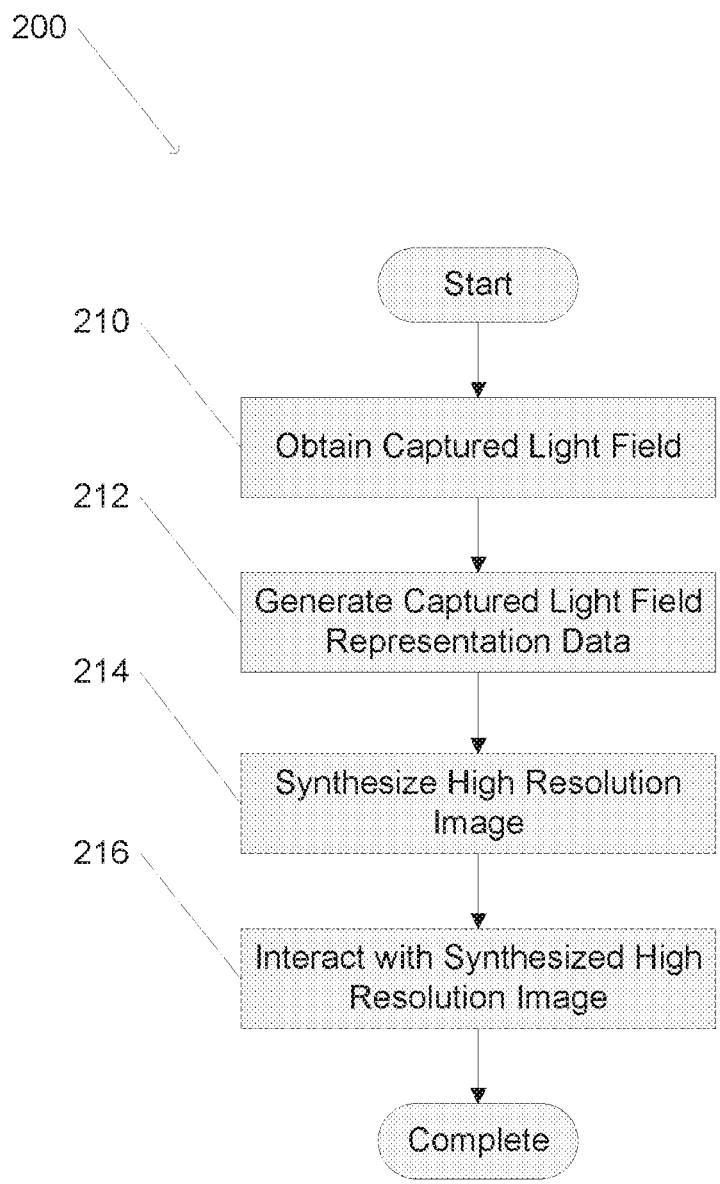
FIG. 2 is a flow chart conceptually illustrating a process for capturing and processing light fields in accordance with an embodiment of the invention.

A captured light field, as an array of images, can consume a significant amount of storage space. Generating compressed light field representation data using the captured light field while reducing the storage space utilized can be a processor-intensive task. A variety of array cameras in accordance with embodiments of the invention lack the processing power to simultaneously capture and process light fields while maintaining adequate performance for one or both of the operations. Array cameras in accordance with several embodiments of the invention are configured to separately obtain a captured light field and generate compressed light field representation data using the captured light field, allowing the array camera to quickly capture light fields and efficiently process those light fields as the processing power becomes available and/or the compressed light field representation data is needed. A process for processing and interacting with captured light fields in accordance with an embodiment of the invention is illustrated in FIG. 2. The process 200 includes reading (210) image data from a captured light field out of an array camera module. Compressed light field representation data is generated (212) from the captured light field. In a variety of embodiments, a high resolution image is synthesized (214) using the compressed light field representation data. In several embodiments, users can then interact (216) with the synthesized high resolution image in a variety of ways appropriate to the requirements of a specific application in accordance with embodiments of the invention.

In many embodiments, a captured light field is obtained (210) using an imager array and a processor in the array camera generating (212) the compressed light field representation data. In a number of embodiments, a captured light field is obtained (210) from a separate device. In several embodiments, the captured light field is obtained (210) and compressed light field representation data is generated (212) as part of a single capture operation. In a variety of embodiments, obtaining (210) the captured light field and generating (212) the compressed light field representation data occurs at disparate times.

Generating (212) the compressed light field representation data includes normalizing the obtained (210) captured light field and generating a depth map for the obtained (210) captured light field using geometric calibration data and photometric calibration data. In many embodiments, parallax detection processes, such as those disclosed in U.S. patent application Ser. No. 13/972,881, are utilized to generate a depth map and prediction error data describing correlation between pixels in the captured light field from the perspective of one or more reference images. Processes other than those disclosed in U.S. patent application Ser. No. 13/972,881 can be utilized in accordance with many embodiments of the invention. The generated (212) compressed light field representation data includes the prediction error data, the reference images, and the depth map. Additional metadata, such as timestamps, location information, and sensor information, can be included in the generated (212) compressed light field representation data as appropriate to the requirements of specific applications in accordance with embodiments of the invention. In many embodiments, the generated (212) compressed light field representation data is compressed using lossy and/or non-lossy compression techniques. The generated (212) compressed light field representation data can be stored in a variety of formats, such as the JPEG-DX standard. In several embodiments, the alternate view images in the obtained (210) captured light field are not stored in the generated (212) compressed light field representation data.

In a number of embodiments, synthesizing (214) a high resolution image utilizes the reference image(s), the prediction error data, and the depth map in the generated (212) compressed light field representation data. In a variety of embodiments, the reference images, the prediction error data, and the depth map are utilized to reconstruct the array of images (or an approximation of the images) to synthesize (214) a high resolution image using a super-resolution process. A high resolution image can be synthesized (214) using the array of images representing the captured light field reconstructed based on the compressed light field representation data (212). However, in a number of embodiments synthesizing (214) a high resolution image using the generated (212) compressed light field representation data includes reconstructing (e.g. decoding) the array of images using the compressed light field representation data once the captured light field is to be viewed, such as in an image viewing application running on an array camera or other device. Techniques for decoding compressed light field representation data that can be utilized in accordance with embodiments of the invention are described in more detail below. In several embodiments, high resolution images are synthesized (214) at a variety of resolutions to support different devices and/or varying performance requirements. In a number of embodiments, the synthesis (214) of a number of high resolution images is part of an image fusion process such as the processes described in U.S. patent application Ser. No. 12/967,807, the disclosure of which is incorporated by reference above.

Many operations can be performed while interacting (216) with synthesized high resolution images, such as, but not limited to, modifying the depth of field of the synthesized high resolution image, changing the focal plane of the synthesized high resolution image, recoloring the synthesized high resolution image, and detecting objects within the synthesized high resolution image. Systems and methods for interacting (216) with compressed light field representation data and synthesized high resolution images that can be utilized in accordance with embodiments of the invention are disclosed in U.S. patent application Ser. No. 13/773,284 to McMahon et al., the entirety of which is hereby incorporated by reference.

Although a specific process processing and interacting with captured light fields in accordance with an embodiment of the invention is described above with respect to FIG. 2, a variety of image deconvolution processes appropriate to the requirements of specific applications can be utilized in accordance with embodiments of the invention. Processes for generating compressed light field representation data using captured light fields in accordance with embodiments of the invention are discussed below.

Generating Compressed Light Field Representation Data

Figure 3:
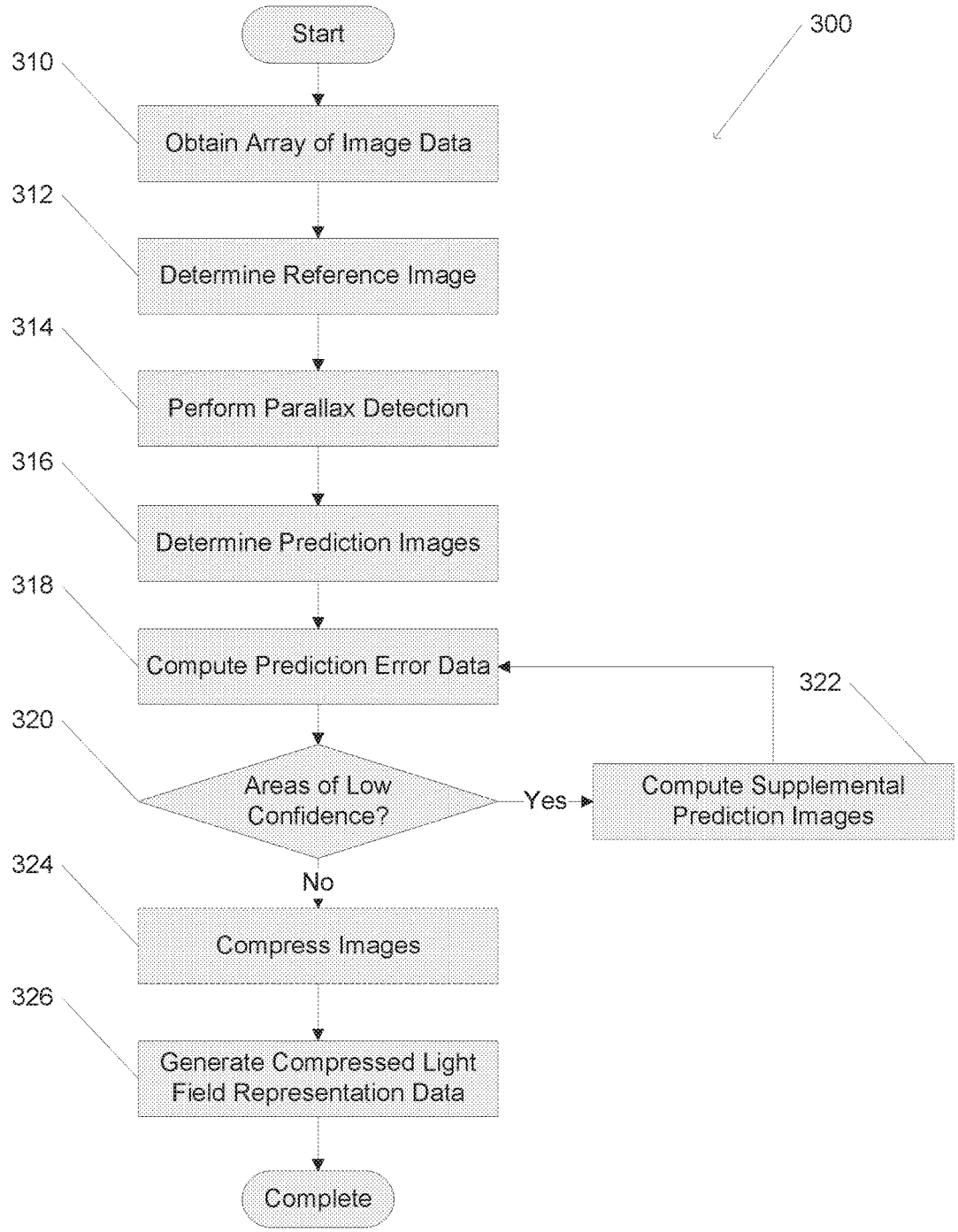
FIG. 3 is a flow chart conceptually illustrating a process for generating compressed light field representation data in accordance with an embodiment of the invention.

A process for generating compressed light field representation data in accordance with an embodiment of the invention is illustrated in FIG. 3. The process 300 includes obtaining (310) an array of image data. A reference image viewpoint (e.g. a desired viewpoint for the reference image) is determined (312). Parallax detection is performed (314) to form a depth map from this reference viewpoint. Predicted images are determined (316) corresponding to the alternate view image by propagating pixels from the reference image to the alternate view grid. Prediction error data is computed (318) as the difference between the predicted image and the corresponding alternate view image. Where areas of low confidence are detected (320), supplemental prediction images and supplemental prediction error data is computed (322). In a variety of embodiments, the reference image(s), prediction error data, and/or the depth map are compressed (324). Compressed light field representation data can then be created (326) using the reference image(s), prediction error data, and/or depth map(s).

In a variety of embodiments, the array of images is obtained (310) from a captured light field. In several embodiments, the obtained (310) array of images is packets of image data captured using an imager array. In many embodiments, the determined (312) reference image corresponds to the reference viewpoint of the array of images. Furthermore, the determined (312) reference image can be an arbitrary image (or synthetic image) in the obtained (310) array of images. In a number of embodiments, each image in the obtained (310) array of images is associated with a particular color channel, such as, but not limited to, green, red, and blue. Other colors and/or portions of the electromagnetic spectrum can be associated with each image in the array of images in accordance with a variety of embodiments of the invention. In several embodiments, the determined (312) reference image is a green image in the array of images. Parallax detection is performed (314) with respect to the viewpoint of the determined (312) reference image to locate pixels corresponding to pixels in a reference image by searching along epipolar lines in the alternate view images in the array of images. In a number of embodiments, the parallax detection uses correspondences between cameras that are not co-located with the viewpoint of the reference image(s). In many embodiments, the search area need not be directly along an epipolar line, but rather a region surrounding the epipolar line; this area can be utilized to account for inaccuracies in determining imager calibration parameters and/or the epipolar lines. In several embodiments, parallax detection can be performed (314) with a fixed and/or dynamically determined level of precision; this level of precision can be based on performance requirements and/or desired compression efficiency, the array of images, and/or on the desired level of precision in the result of the performed (314) parallax detection. Additional techniques for performing parallax processes with varying levels of precision are disclosed in U.S. Provisional Patent Application Ser. No. 61/780,974, filed Mar. 13, 2013, the entirety of which is hereby incorporated by reference.

Disparity Information from a Single Reference Image

Figure 4A:
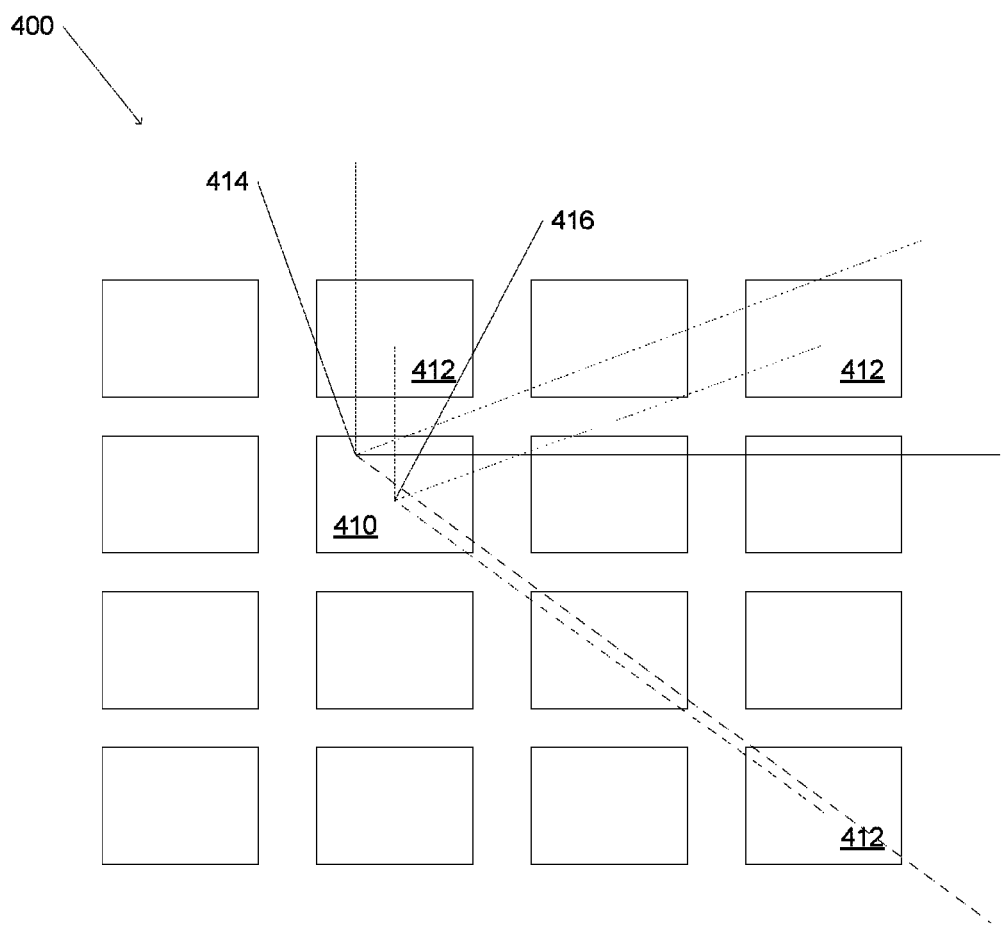
FIG. 4A is a conceptual illustration of a reference image in an 4×4 array of images and corresponding epipolar lines in accordance with an embodiment of the invention.

Turning now to FIG. 4A, a conceptual illustration of a two-dimensional array of images and associated epipolar lines as utilized in determining pixel correspondences in accordance with an embodiment of the invention is shown. The 4×4 array of images 400 includes a reference image 410, a plurality of alternate view images 412, a plurality of epipolar lines 414, and baselines 416 representing the distance between optical centers of particular pairs of cameras in the array. Performing (314) parallax detection along epipolar lines 414 calculates disparity information for the pixels in one or more of the alternate view images 412 relative to the corresponding pixels in the reference image 410. In a number of embodiments, the epipolar lines are geometric distortion-compensated epipolar lines between the pixels corresponding to the photosensitive sensors in the focal planes in the imager array that captured the array of images. In several embodiments, the calculation of disparity information first involves the utilization of geometric calibration data so that disparity searches can be directly performed along epipolar lines within the alternate view images. Geometric calibration data can include a variety of information, such as inter- and intra-camera lens distortion data obtained from an array camera calibration process. Other geometric calibration data can be utilized in accordance with a number of embodiments of the invention. In a variety of embodiments, photometric pre-compensation processes are performed on one or more of the images prior to determining the disparity information. A variety of photometric pre-compensation processes, such as vignette correction, can be utilized in accordance with many embodiments of the invention. Although specific techniques for determining disparity are discussed above, any of a variety of techniques appropriate to the requirements of a specific application can be utilized in accordance with embodiments of the invention, such as those disclosed in U.S. patent application Ser. No. 13/972,881, incorporated by reference above.

In a variety of embodiments, performing (314) parallax detection includes generating a depth map describing depth information in the array of images. In many embodiments, the depth map is metadata describing the distance from the reference camera (i.e. viewpoint) to the portion of the scene captured in the pixels (or a subset of the pixels) of an image determined using the corresponding pixels in some or all of the alternate view images. In several embodiments, candidate corresponding pixels are those pixels in alternate view images that appear along epipolar lines from pixels in the reference image. In a number of embodiments, a depth map is generated using only images in the array of images that are associated with the same color (for example, green) as the reference image. In several embodiments, the depth map is generated using images of the same color but a different color than the reference camera. For example, with a green reference image, a depth map can be generated using only the images associated with the color red (or blue) in the array of images. In many embodiments, depth information is determined with respect to multiple colors and combined to generate a depth map; e.g. depth information is determined separately for the subsets of green, red, and blue images in the array of images and a final depth map is generated using a combination of the green depth information, the red depth information, and the blue depth information. In a variety of embodiments, the depth map is generated using information from any set of cameras in the array. In a variety of embodiments, the depth map is generated without respect to colors associated with the images and/or with a combination of colors associated with the images. In several embodiments, performing (314) parallax detection can be performed utilizing techniques similar to those described in U.S. patent application Ser. No. 13/972,881, incorporated by reference above. Additionally, non-color images (such as infrared images) can be utilized to generate the depth map as appropriate to the requirements of specific embodiments of the invention.

Although a specific example of a 4×4 array of images that can be utilized to determine disparity information and a depth map from a reference image in the 4×4 array of images is described above with respect to FIG. 4A, any size array, and any set of cameras in that array can be used to determine disparity information and a depth map in accordance with embodiments of the invention.

Returning now to FIG. 3, depth information determined during the performed (314) parallax detection is used to determine (316) prediction images including pixel location predictions for one or more pixels in the reference image in at least one alternate view image. In several embodiments, the depth map generated during parallax detection can be used to identify pixel locations within alternate view images corresponding to a pixel location within the reference image with fractional pixel precision. In a variety of embodiments, determining (316) a prediction image in the alternate view includes mapping the fractional pixel location to a specific pixel location (or pixel locations) within the pixel grid for the alternate view image. In several embodiments, specific integer grid pixel location(s) in the predicted image for the alternate view are determined as a function of the neighbors within the support region. These functions include, but are not limited to the nearest neighbor (or a function of the nearest N neighbors) to the integer grid point within the support region. In other embodiments, any other localized fixed or adaptive mapping technique including (but not limited) to techniques that map based on depth in boundary regions can be utilized to identify a pixel within an alternate view image for the purpose of generating a prediction for the selected pixel in the alternate view image. Additionally, filtering can be incorporated into the computation of prediction images in order to reduce the amount of prediction error. In several embodiments, the prediction error data is computed (318) from the difference of the prediction image(s) and their respective alternative view image(s). The prediction error data can be utilized in the compression of one or more images in the captured light field. In several embodiments, the computed (318) prediction error data is the signed difference between the values of a pixel in the predicted image and the pixel at the same grid position in the alternate view image. In this way, the prediction error data typically does not reflect the error in the location prediction for a pixel in the reference image relative to a pixel location in the alternate view image. Instead, the prediction error data primarily describes the difference in photometric information between a pixel in the determined prediction image that was generated by propagating pixels from the reference image and a pixel in an alternate view image. Although specific techniques are identified for determining predicted images utilizing correspondence information determined using a depth map, any of a variety of approaches can be utilized for determining prediction images utilizing correspondence information determined using a depth map as appropriate to the requirements of a specific application in accordance with embodiments of the invention.

In a variety of embodiments, virtual red, virtual green, and/or virtual blue reference images can be utilized as a reference image. For example, a depth map can be determined for a particular reference viewpoint that may not correspond to the location of a physical camera in the array. This depth map can be utilized to form a virtual red image, virtual green, and/or virtual blue image from the captured light field. These virtual red, virtual green, and and/or virtual blue images can then be utilized as the reference image(s) from which to create the prediction images for the alternate view(s) utilized in the processes described above. By way of a second example, one or more virtual red, virtual green, and/or virtual blue images and/or physical red, green, and/or blue images within the array of images can be used as reference images. When forming the prediction error, the depth map can be utilized to form a prediction image from virtual and/or actual reference image(s) and calculate the prediction error with respect to the corresponding alternate view images.

Figure 5:
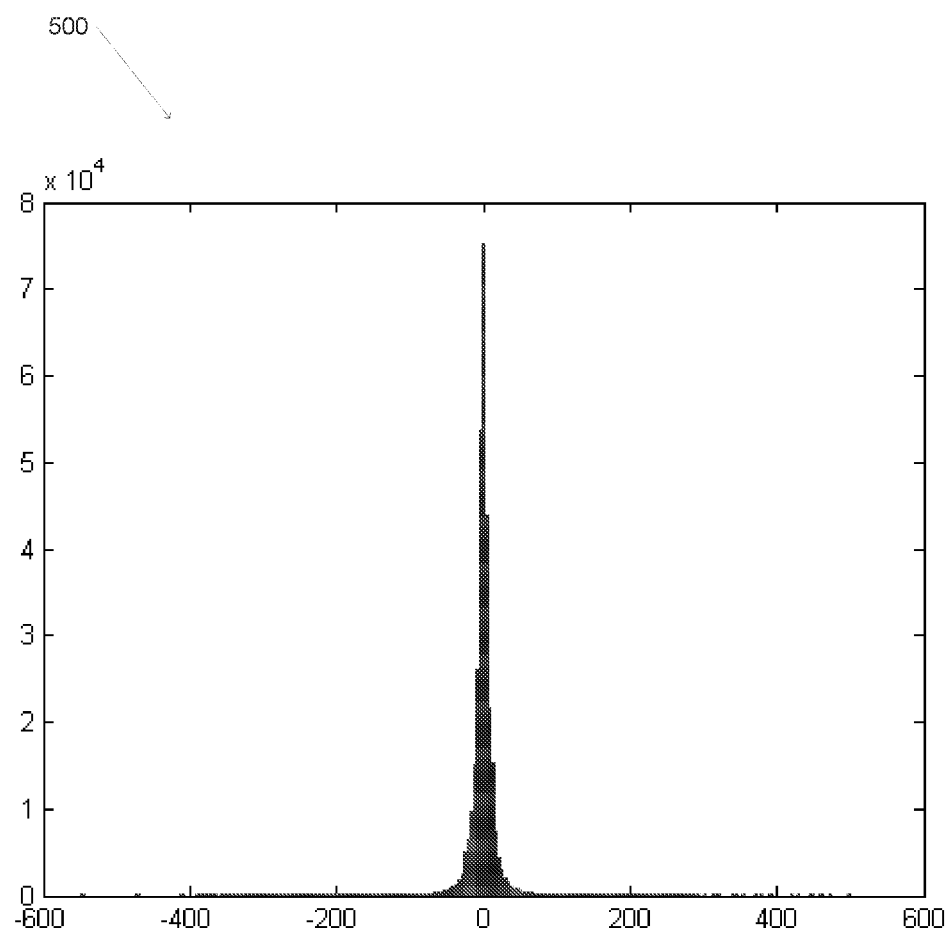
FIG. 5 is a conceptual illustration of a prediction error histogram in accordance with an embodiment of the invention.

Turning now to FIG. 5, a prediction error histogram 500 conceptually illustrating computed (318) prediction error data between pixels in a predicted image and an alternate view image in accordance with an embodiment of the invention is shown. The prediction error represented by prediction error histogram 500 can be utilized in the compression of the corresponding image data using the computed (318) prediction error data. Although a specific example of a prediction error histogram in accordance with an embodiment of the invention is conceptually illustrated in FIG. 5, any variety of prediction errors, including those that have statistical properties differing from those illustrated in FIG. 5, and any other applicable error measurement can be utilized in accordance with the requirements of embodiments of the invention.

Returning now to FIG. 3, the correlation between spatially proximate pixels in an image can be exploited to compare all pixels within a patch of an alternate view image to a pixel and/or a patch from a reference image in several embodiments of the invention. Effectively, the pixels from a region in the predicted image are copied from a patch in the reference image. In this way, a trade-off can be achieved between determining fewer corresponding pixel locations based on the depth and/or generating a lower resolution depth map for a reference image and encoding a potentially larger range of prediction errors with respect to one or more alternate view images. In a number of embodiments, the process of encoding the prediction error data can be adaptive in the sense that pixels within a region of an alternate view image can be encoded with respect to a specific pixel in a reference image and a new pixel from the reference image can be selected that has a corresponding pixel location closer to a pixel in the alternate view image in the event that the prediction error exceeds a predetermined threshold.

Prediction error data for the alternate view is computed (318) using the determined (312) reference image, the determined (316) prediction images, and depth map. For the reference image $p_{ref}$ and alternate view images $p_{k,l}$ where k,l represents the location of the alternate view image in the array of images p, the depth information provides a subset of images $p_{k,l}$ where $$p_{ref}(x,y) := p_{k,l}(i,j)$$

where (x,y) is the location of a pixel in $p_{ref}$ and (i,j) is the location of a pixel at a fractional location in $p_{k,l}$ corresponding to a pixel in $p_{ref}(x,y)$ based on the depth information. Using these mappings of subsets of pixels to the alternate viewpoint $p_{k,l}$ a prediction image is calculated from the reference pixels mapping to $p_{k,l}$. (316). The prediction error data $E_{k,l}$ can be computed (318) between $p_{ref}$ and the prediction image for viewpoint $p_{k,l}$ described above. In a variety of embodiments, the determined (316) prediction images include sparse images. The missing values for the sparsely populated images can be interpolated using populated values within a neighborhood of the missing pixel value. For example, a kernel regression may be applied to the populated values to fill in the missing prediction values. In these cases, the prediction error data $E_{k,l}$ is a representation of the error induced by the interpolation of the missing values.

In many embodiments, the determined (316) initial prediction image is a sparsely populated grid of fractionally-positioned points from the reference frame $p_{ref}$ that includes "holes" that are locations or regions on the alternate view integer grid that are not occupied by any of the pixels mapped from the reference frame $p_{ref}$. The presence of "holes" can be particularly prevalent in occluded areas but may occur in non-occlusion regions due to non-idealities in the depth map or due to the fact that many pixels in the reference camera correspond to fractional positions in the alternate view image. In several embodiments, holes in the prediction error data can be filled using the absolute value of the pixel location in the alternate view image $p_{k,l}$. This is similar to filling the predicted image with a value of zero (i.e. any null value or default value) to ensure that the coded error is equal to the value of the pixel in the alternate view image at that position. In a variety of embodiments, "holes" in a predicted image can be filled using interpolation with predicted values from neighboring pixels to create additional predictions for the holes based on the pixels from the predicted image. As can be readily appreciated, any interpolator can be utilized to create interpolated predicted image pixels from pixels propagated from the reference image. The details of the interpolation scheme used is a parameter of the encoding and decoding process and should be applied in both the encoder and decoder to ensure lossless output. In a variety of embodiments, residuals can provide more efficient compression than encoding holes with absolute values. In several embodiments, the pixels from the reference image $p_{ref}$ do not map to exact grid locations within the prediction image and a mapping that assigns a single pixel value to multiple adjacent pixel locations on the integer grid of the prediction image is used. In this way, there is a possibility that multiple pixels from the reference image $p_{ref}$ may map to the same integer grid location in the prediction image. In this case, pixel stacking rules can be utilized to generate multiple prediction images in which different stacked pixels are used in each image. In many embodiments, if N pixels exist in a pixel stack, then the resulting predicted value could be the mean of the N pixel values in the stack. However, any number of prediction images can be computed and/or any other techniques for determining prediction images where multiple pixels map to the same location (e.g. a pixel stack exists) as appropriate to the requirements of specific embodiments of the invention. In a variety of embodiments, holes can remain within the predicted images after the initial interpolation; additional interpolation processes can be performed until every location on the integer grid of the predicted image (or a predetermined number of locations) is assigned a pixel value. Any interpolation technique, such as kernel regression or inpainting, can be used to fill the remaining holes as described. In other embodiments, a variety of techniques can be utilized to achieve compression of raw data that involve creating multiple prediction images and/or pieces of prediction error data. Furthermore, any variety of interpolation techniques known to those skilled in the art can be utilized to fill holes in a prediction image as appropriate to the requirements of a specific application in accordance with embodiments of the invention.

Prediction Error Data from Multiple Reference Images

In a variety of embodiments, performing (314) parallax detection does not return accurate disparity information for pixels in alternate view images that are occluded, appear in featureless (e.g. textureless) areas relative to the reference image, or where the depth map exhibits other non-idealities such as photometric mismatch. Using the determined (316) prediction error data and/or the depth map and/or a confidence map describing areas of low confidence in the depth map, areas of low confidence can be identified (320). Areas of low confidence indicate areas in the reference viewpoint where the depth measurement may be inaccurate or the pixels may otherwise not photometrically correspond (for example due to defects in the reference image), leading to potential inefficiencies in compression and/or performance. Low confidence can be determined in a variety of ways, such as identifying areas having a parallax cost function exceeding a threshold value. For example, if the parallax cost function indicates a low cost (e.g. low mismatch), this indicates that the focal planes agree on a particular depth and the pixels appear to correspond. Similarly, a high cost indicates that not all focal planes agree with respect to the depth, and therefore the computed depth is unlikely correctly represent the locations of objects within the captured light field. However, any of a variety of techniques for identifying areas of low confidence can be utilized as appropriate to the requirements of specific embodiments of the invention, such as those disclosed in U.S. patent application Ser. No. 13/972,881, incorporated by reference above. In many embodiments, these potential inefficiencies are disregarded and no additional action is taken with respect to the identified (320) areas of low confidence. In several embodiments, potential inefficiencies are disregarded by simply encoding the pixels from the alternate view images rather than computing the prediction error. In a number of embodiments, if an area of low confidence (e.g. correspondence mismatch) is identified (320), one or more additional reference images are selected and supplemental prediction images (or portions of supplemental prediction image(s)) are computed (322) from the additional reference images. In several embodiments, additional reference images or portions of additional reference images are utilized when detected objects in the array of images for areas where the determined (316) prediction error data would be large using a single reference image; for example, in an occlusion zone). A large prediction error rate can be predicted when objects in a captured light field are close to the imager array, although any situation where a large prediction error rate is (316) determined can be the basis for selecting additional reference images in accordance with embodiments of the invention.

Figure 4B:
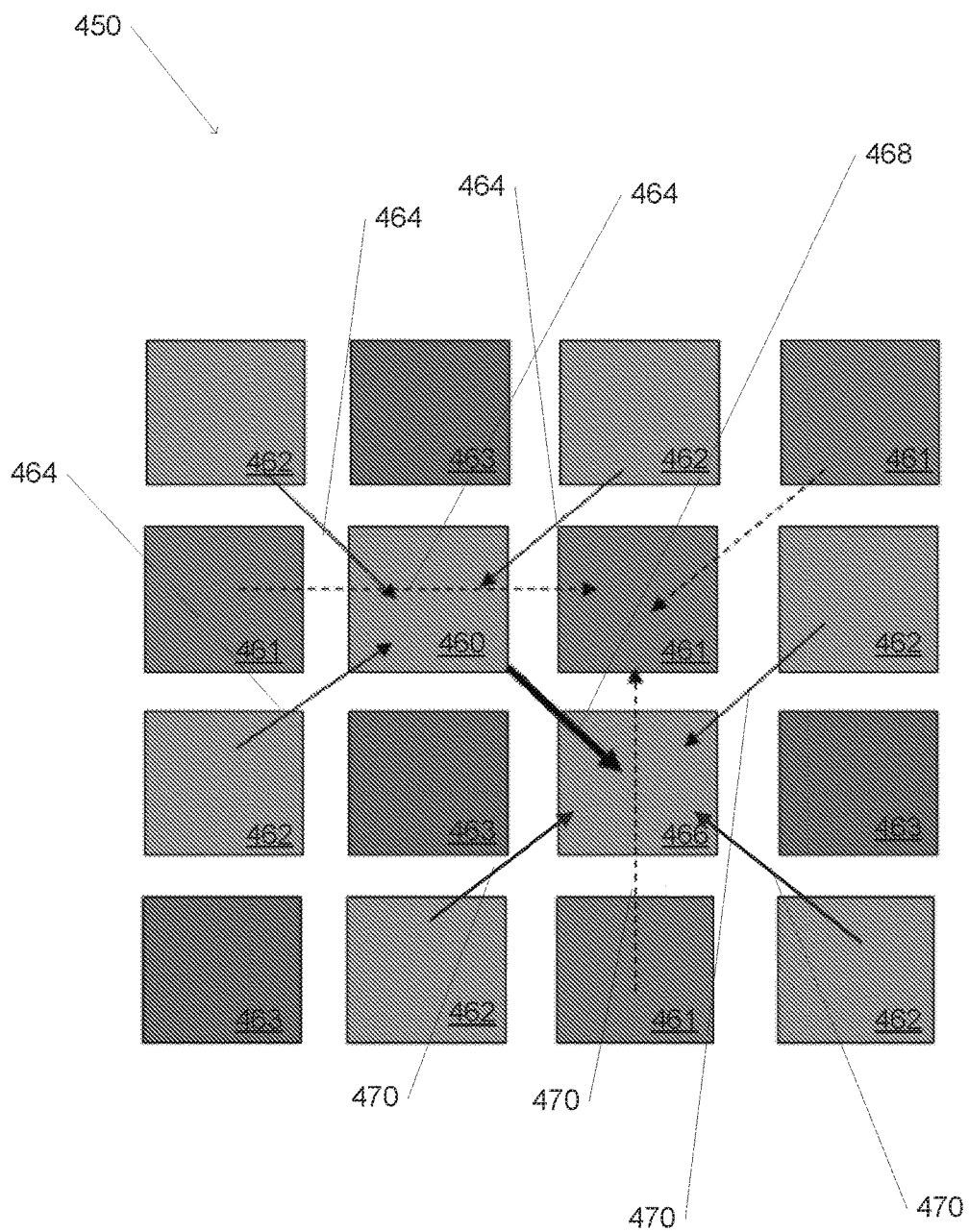
FIG. 4B is a conceptual illustration of multiple reference images in a 4×4 array of images in accordance with an embodiment of the invention.

Turning now to FIG. 4B, a conceptual illustration of a two-dimensional array of images from two reference images as utilized in determining supplemental pixel correspondences in accordance with an embodiment of the invention is shown. The 4×4 array of images 450 includes a reference image 460, a secondary reference image 466, a plurality of green alternate view images 462, a plurality of red alternate view images 461, a plurality of blue alternate view images 463, a plurality of prediction dependencies 464 extending from the reference image 460, and a plurality of secondary prediction dependencies 470 extending from the secondary reference image 466. A baseline 468 extends from the primary reference image 460 to the secondary reference image 466. Primary prediction images are computed (316) from those alternate view images associated with the reference image 460 by the prediction dependencies 464 utilizing processes similar to those described above. Likewise, supplemental prediction images are computed (322) along secondary epipolar lines from the secondary reference image 466 using those alternate view images associated with the secondary reference image 466 via the secondary prediction dependencies 470. In a number of embodiments, the pixels in the computed (322) supplemental prediction images can be mapped to the pixels in the reference image 460 using baseline 468.

In several embodiments, the alternate view images that are utilized in performing (314) parallax detection are clustered around the respective reference image that is utilized in performing (314) parallax detection. In a variety of embodiments, the images are clustered in a way to reduce the disparity and/or improve pixel correspondence between the clustered images, thereby reducing the number of pixels from the alternate view images that are occluded from the viewpoints of both the reference image and the secondary reference image. In many embodiments, the alternate view images are clustered to the primary reference image 460, the secondary reference image 466, and/or together based on the color associated with the images. For example, if reference image 460 and secondary reference image 466 are green, only the green alternate view images 462 are associated with the reference image 460 and/or the secondary reference image 466. Likewise, the red alternate view images 461 (or the blue alternate view images 463) are associated with each other for the purposes of computing (322) supplemental prediction images and/or performing (314) parallax detection.

In many embodiments, particularly those embodiments employing lossless compression techniques, the secondary reference image 466 is predicted using the reference image 460 and the baseline 468 that describes the distance between the optical centers of the reference image and the secondary reference image. In several embodiments, the secondary reference image 466 is selected to reduce the size of the occlusion zones (and thus predictability of pixels); that is, parallax detection is performed and error data is determined as described above using the secondary reference image 466. In many embodiments, the secondary reference image 466 is associated with the same color channel as the reference image 460. A specific example of a two-dimensional array of images with two reference images that can be utilized to compute (322) supplemental prediction images is conceptually illustrated in FIG. 4B; however, any array of images and more than two reference images can be utilized in accordance with embodiments of the invention. For example, supplemental references images can be computed per color channel. Taking the array illustrated in FIG. 4B, six reference images (one primary reference image for each of the red, blue, and green channels along with one secondary reference image for each of the red, blue, and green channels) can be utilized in the generation of prediction images and the associated predicted error data. Additionally, in a variety of embodiments, a subset of the pixels within the reference image and/or supplemental reference image (e.g. a region or a sub-portion) can be utilized in the calculation of prediction error data utilizing processes similar to those described above.

In a variety of embodiments, particularly those utilizing lossy compression techniques, a variety of coding techniques can be utilized to account for the effects of lossy compression in the reference images when predicting an alternate view image. In several embodiments, before the prediction image and prediction error data for the alternate view image are formed, the reference image is compressed using a lossy compression algorithm. The compressed reference image is then decompressed to form a lossy reference image. The lossy reference image represents the reference image that the decoder will have in the initial stages of decoding. The lossy reference image is used along with the depth map to form a lossy predicted image for the alternate view image. The prediction error data for the alternate view image is then calculated by comparing the lossy reference image with the alternate view image (e.g. by taking the signed difference of the two images). In this way, when using lossy compression, the prediction error data will take into account the lossy nature of the encoding of the reference image when forming the prediction error data.

In a variety of embodiments, the alternative reference images are based on the reference image. In several embodiments, the reference image used to predict the viewpoint of the alternate reference image undergoes a lossy compression. A lossy compression is applied to the prediction error data for the alternate reference image. The reference image is then decompressed to generate a lossy reference image. A lossy predicted image is generated from the decompressed reference image for the alternate reference image. The compressed prediction error data is decompressed to form the lossy prediction error data. The lossy prediction error data is added to the lossy predicted image to form the lossy predicted alternate reference image. The prediction image and prediction error data for any subsequent alternate view image that depends on the alternate reference image will be formed using the lossy predicted alternate reference image. In a number of embodiments, this forms the alternate view image that can be reconstructed utilizing lossy reconstruction techniques as described below. This process can be repeated for each alternate view image as necessary. In this way, prediction error data can be accurately computed (relative to the uncompressed light field data) using the lossy compressed image data.

Returning now to FIG. 3, in a number of embodiments, the determined (312) reference image along with the computed (318) prediction error data and/or any computed (322) supplemental prediction images (if relevant) are compressed (324). In many embodiments, supplemental prediction error data based on the computed (322) supplemental prediction images is compressed (324). This compression can be lossless or lossy depending on the requirements of a particular embodiment of the invention. When the images are compressed (324), they can be reconstructed (either exactly or approximately depending on the compression (324) technique(s) utilized) by forming a predicted alternate view image from the reference image data and the depth map, and adding the decoded prediction error data to the predicted alternate view image(s) using an image decoder. Additionally, particularly in those embodiments utilizing lossy compression techniques, metadata describing the information lost in the compression of the reference image(s) and/or prediction error data can be stored in the compressed light field representation data. Alternatively, this information can be stored in the prediction error data. This information can be utilized in the decoding of the compressed light field representation data to accurately reconstruct the originally captured images by correcting for the information lost in the lossy compression process. Techniques for decoding losslessly compressed light field representation data in accordance with embodiments of the invention are described in more detail below. In a variety of embodiments, the compression (324) of the images depends on the computed (318) prediction error data. Compressed light field representation data is generated (326) using the determined (312) reference image(s) and computed (318) prediction error data along with the depth map generated during the performed (314) parallax detection. In those embodiments with multiple reference images, the secondary reference images or portions of the secondary reference images can be included in the compressed light field representation data and/or the secondary reference images can be reconstructed using the computed (318) prediction error data with respect to the reference image. Additional metadata can be included in the generated (326) compressed light field representation data as appropriate to the requirements of a specific application in accordance with embodiments of the invention.

In a variety of embodiments, supplemental depth information is incorporated into the depth map and/or as metadata associated with the compressed light field representation data. In a number of embodiments, supplemental depth information is encoded with the additional reference viewpoint(s). In many embodiments, the depth information used for each reference viewpoint is calculated using any sets of cameras during the encoding process that may be similar or may be different depending on the viewpoint. In many embodiments, depth for an alternate reference viewpoint is calculated for only sub-regions of the alternate reference viewpoint so that an entire depth map does not need to be encoded for each viewpoint. In many embodiments, a depth map for the alternate reference viewpoint is formed by propagating pixels from the depth map from a primary reference viewpoint. If there are holes in the depth map propagated to the alternate reference viewpoint they can be filled by interpolating from nearby propagated pixels in the depth map, or through direct detection from the alternate viewpoint. In many embodiments, the depth map from the alternate reference viewpoint can be formed by a combination of propagating depth values from another reference viewpoint, interpolating for missing depth values in the alternate reference viewpoint, or directly detecting regions of particular depth values in the alternative reference viewpoint. In this way, the depth map created by performing (314) parallax detection above can be augmented with depth information generated from alternate reference images.

A specific process for generating compressed light field representation data in accordance with an embodiment of the invention is described above with respect to FIG. 3; however, a variety of processes appropriate to the requirements of specific applications can be utilized in accordance with embodiments of the invention. In particular, the above processes can be performed using all or a subset of the images in the obtained (310) array of images.

Decoding Compressed Light Field Representation Data

Figure 6:
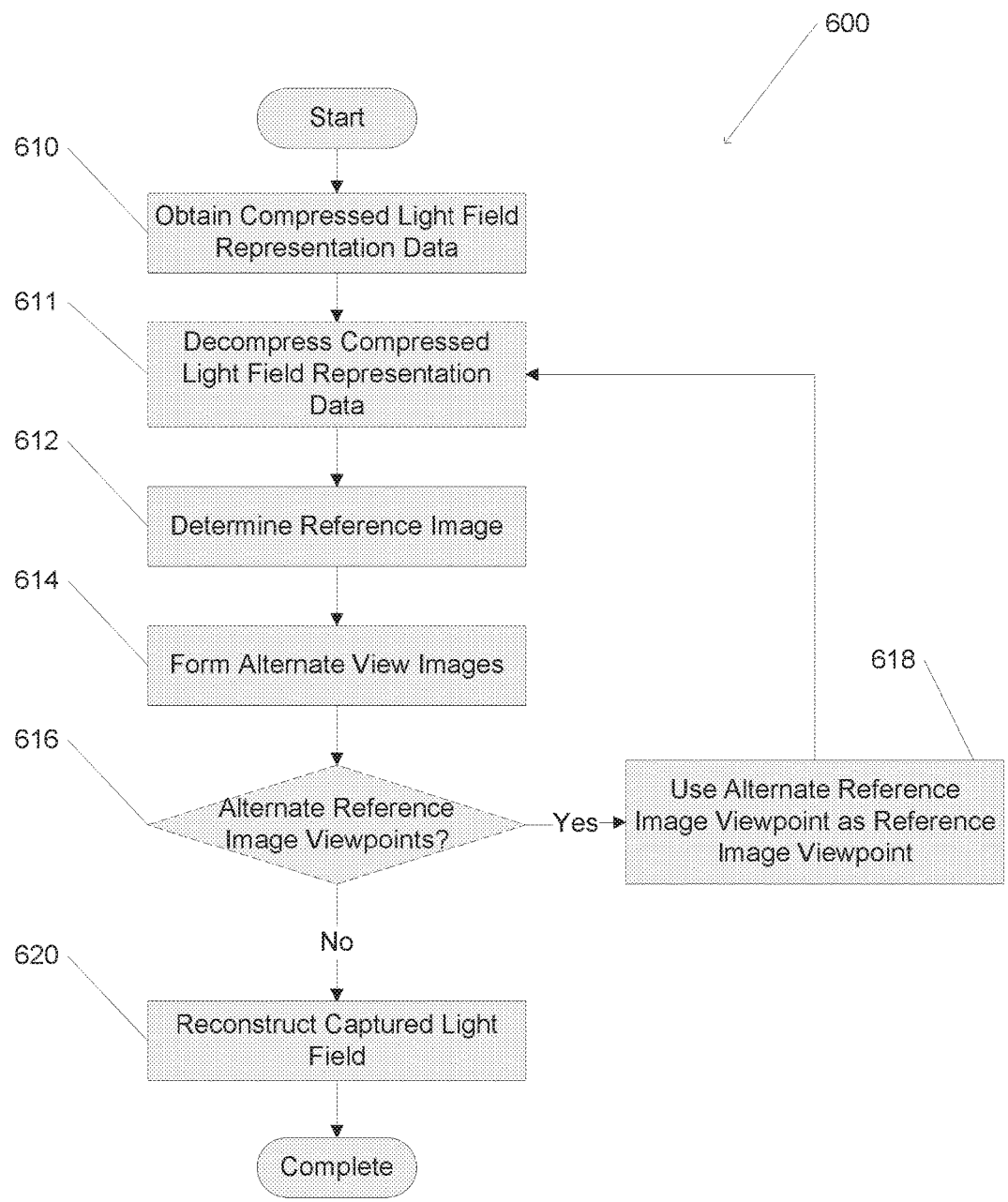
FIG. 6 is a flow chart conceptually illustrating a process for decoding compressed light field representation data in accordance with an embodiment of the invention.

As described above, compressed light field representation data can be utilized to efficiently store captured light fields. However, in order to utilize the compressed light field representation data to perform additional processed on the captured light field (such as parallax processes), the compressed light field representation data need be decoded to retrieve the original (or an approximation of the) captured light field. A process for decoding compressed light field representation data is conceptually illustrated in FIG. 6. The process 600 includes obtaining (610) compressed light field representation data. In many embodiments, the compressed light field representation data is decompressed (611). A reference image is determined (612) and alternate view images are formed (614). In many embodiments, alternative reference images are present (616). If alternative reference image are present, the process 600 repeats using (618) the alternative reference image(s). Once the alternate view images are reconstructed, the captured light field is reconstructed (620).

In a variety of embodiments, decompressing (611) the captured light field representation data includes decompressing the reference image, depth map, and/or prediction error data compressed utilizing techniques described above. In several embodiments, the reference image (612) corresponds to a viewpoint (e.g. a focal plane in an imager array) image in the compressed light field representation data; however, it should be noted that reference images from virtual viewpoints (e.g. viewpoints that do not correspond to a focal plane in the imager array) can also be utilized as appropriate to the requirements of specific embodiments of the invention. In a number of embodiments, the alternate view images are formed (614) by computing prediction images using the determined (612) reference image and the depth map, then applying the prediction error data to the computed prediction images. However, any technique for forming (614) the alternate view images, including directly forming the alternate view images using the determined (612) reference image and the prediction error data, can be utilized as appropriate to the requirements of specific embodiments of the invention. Additionally, metadata describing the interpolation techniques utilized in the creation of the compressed light field representation data can be utilized in computing the prediction images. In this way, the decoding process results in prediction images that, once the prediction error data is applied to the prediction images, correct (or an approximation to correct) alternate view images are formed (614). This allows for multiple interpolation techniques to be utilized in the encoding of compressed light field representation data, e.g. adaptive interpolation techniques can be utilized based on the requirements of specific embodiments of the invention. The captured light field is reconstructed (620) using the alternative view images and the reference image. In many embodiments, the captured light field also includes the depth map, the prediction error data, and/or any other metadata included in the compressed light field representation data.

In a variety of embodiments, multiple reference images (e.g. a primary reference image and one or more secondary reference images) exist within the compressed light field representation data. The alternate reference images can be directly included in the compressed light field representation data and/or formed utilizing techniques similar to those described above. Using (618) an alternative reference image further includes recursively (and/or iteratively) forming alternate view images from the viewpoint of each reference image utilizing techniques described above. In this way, the alternative view images are mapped back to the viewpoint of the (primary) reference image and allowing the captured light field to be reconstructed (620).

In those embodiments utilizing lossy compression techniques, information critical to determining (612) the reference image and/or an alternative reference image can be lost. However, this loss can be compensated for by storing the lost information as metadata within the compressed light field representation data and/or as part of the prediction error data. Then, when determining (612) the reference image and/or the alternate reference image, the metadata and/or prediction error data can be applied to the compressed image in order to reconstruct the original, uncompressed image. Using the uncompressed reference image, the decoding of the compressed captured light field representation data can proceed utilizing techniques similar to those described above to reconstruct (320) the captured light field. In a variety of embodiments, predicting the alternative reference image from the reference image, if lossy compression is used, includes reconstructing the alternate reference image by coding and decoding (losslessly) the prediction error data then adding the decoded prediction error to the reference image. In this way, the original alternate reference image can be reconstructed and used to predict specific alternate views as described above.

A specific process for decoding compressed light field representation data in accordance with an embodiment of the invention is described above with respect to FIG. 6; however, a variety of processes appropriate to the requirements of specific applications can be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for decoding compressed light field representation data comprising:
    obtaining, using a processor, compressed light field representation data, wherein the compressed light field representation data contains a compressed representation of a plurality of images of a scene captured from multiple points of view comprising a compressed representation of a reference image, a depth map, and prediction error data;
    decompressing a reference image, a depth map, and prediction error data from the compressed light field representation data;
    forming at least one alternate view image by:
        computing at least one prediction image using the reference image and the depth map; and
        applying the prediction error data to modify the pixels of the at least one computed prediction image to generate the at least one alternate view image;
    wherein the reference image and the at least one alternative view image form a light field comprising a plurality of images captured from multiple points of view.

2. The method of claim 1, wherein the reference image corresponds to a viewpoint image in the compressed light field representation data.

3. The method of claim 2, wherein the viewpoint image corresponds to a focal plane in an imager array.

4. The method of claim 1, wherein the reference image corresponds to a virtual viewpoint that does not correspond to a focal plane in an imager array.

5. The method of claim 1, wherein the at least one prediction image is computed using metadata describing interpolation techniques utilized in the creation of the compressed light field representation data.

6. The method of claim 1, wherein the light field further comprises the depth map, the prediction error data, and other metadata included in the compressed light field representation data.

7. The method of claim 1, wherein the compressed light field representation data comprises a plurality of reference images.

8. The method of claim 7, further comprising recursively forming alternate view images from the viewpoint of each reference image.

9. The method of claim 1, wherein the compressed light field representation data comprises the at least one alternate view image.

10. The method of claim 1, wherein the compressed light field representation data comprises metadata and prediction error data providing information that compensates for information lost during a lossy compression.

11. The method of claim 10, wherein determining the reference image comprises applying the metadata and the prediction error data to a compressed image in order to reconstruct an original, uncompressed image.

12. The method of claim 1, wherein the depth map describes the distance from the viewpoint of the reference image with reference to objects imaged by pixels within the reference image.

13. The method of claim 1, wherein a portion of the prediction error data describes a difference in photometric information between a pixel in a prediction image and a pixel in at least one alternate view image corresponding to the prediction image.

14. The method of claim 1, wherein the reference image is a virtual image interpolated from a virtual viewpoint within the image data.

* * * * *